(12) United States Patent
Kim et al.

(10) Patent No.: US 12,330,978 B2
(45) Date of Patent: Jun. 17, 2025

(54) WINDOW MOLDING APPARATUS AND WINDOW MOLDING METHOD USING THE SAME

(71) Applicants: Samsung Display Co., Ltd., Yongin-si (KR); INNOWORKS Co., Ltd., Daejeon (KR)

(72) Inventors: Seung Kim, Seongnam-si (KR); Byunghoon Kang, Hwaseong-si (KR); Seungho Kim, Asan-si (KR); Young Ki Park, Daejeon (KR); Oh Joo Park, Suwon-si (KR); Jong Soo Baek, Sejong-si (KR); Gyuin Shim, Yongin-si (KR); Dae Seong Im, Daejeon (KR)

(73) Assignees: SAMSUNG DISPLAY CO., LTD., Gyeonggi-Do (KR); INNOWORKS CO., LTD, Daejeon (KR)

( * ) Notice: Subject to any disclaimer, the term of this patent is extended or adjusted under 35 U.S.C. 154(b) by 550 days.

(21) Appl. No.: 17/218,105

(22) Filed: Mar. 30, 2021

(65) Prior Publication Data

US 2021/0387891 A1 Dec. 16, 2021

(30) Foreign Application Priority Data

Jun. 15, 2020 (KR) .................. 10-2020-0072550

(51) Int. Cl.
| | |
|---|---|
| *C03B 23/02* | (2006.01) |
| *C03B 23/023* | (2006.01) |
| *C03B 23/03* | (2006.01) |
| *C03C 21/00* | (2006.01) |

(52) U.S. Cl.
CPC ........ *C03B 23/0235* (2013.01); *C03C 21/002* (2013.01)

(58) Field of Classification Search
CPC .............................. C03B 23/02; C03B 11/122
See application file for complete search history.

(56) References Cited

U.S. PATENT DOCUMENTS

| | | | | | |
|---|---|---|---|---|---|
| 2,908,073 | A | * | 10/1959 | Dulin ..................... | D06F 75/38 228/235.1 |
| 3,193,367 | A | * | 7/1965 | Giffen ..................... | C03B 21/02 65/70 |
| 3,582,454 | A | * | 6/1971 | Giffen ..................... | C03B 9/12 428/428 |

(Continued)

FOREIGN PATENT DOCUMENTS

| | | | | |
|---|---|---|---|---|
| CN | 101844399 A | | 9/2010 | |
| CN | 107686230 A | * | 2/2018 | ............. C03B 11/06 |

(Continued)

OTHER PUBLICATIONS

Examples of definitions (Year: 2008).*

*Primary Examiner* — Jodi C Franklin
(74) *Attorney, Agent, or Firm* — CANTOR COLBURN LLP

(57) ABSTRACT

The window molding apparatus for processing a member having first and second opposed, substantially flat sides and a bendable portion disposed therebetween, the apparatus includes a first molding part controlled to move in a substantially linear direction and a jig including a support surface on which the member is seated and a recess in the support surface to receive the bendable portion of the member and the first molding part.

22 Claims, 17 Drawing Sheets

(56) References Cited

U.S. PATENT DOCUMENTS

| | | | | |
|---|---|---|---|---|
| 3,585,829 | A * | 6/1971 | Hurek | B21D 22/12 |
| | | | | 72/63 |
| 3,703,428 | A * | 11/1972 | Poling et al. | B29C 51/14 |
| | | | | 228/903 |
| 3,883,335 | A * | 5/1975 | Polaert | H01J 43/246 |
| | | | | 65/386 |
| 4,304,038 | A * | 12/1981 | Yabu | B21D 51/2684 |
| | | | | 29/458 |
| 4,466,848 | A * | 8/1984 | Ogawa | B32B 5/022 |
| | | | | 156/242 |
| 5,093,177 | A * | 3/1992 | Anderson | C03B 23/0357 |
| | | | | 65/102 |
| 5,238,640 | A * | 8/1993 | Masui | B29C 45/14262 |
| | | | | 264/296 |
| 5,979,211 | A * | 11/1999 | Pahl | B21D 24/08 |
| | | | | 72/351 |
| 6,315,150 | B1 * | 11/2001 | Takai | B29C 51/428 |
| | | | | 220/675 |
| 6,631,560 | B2 | 10/2003 | Imai | H01R 43/16 |
| | | | | 29/874 |
| 8,665,236 | B2 | 3/2014 | Myers | |
| 9,650,278 | B2 | 5/2017 | Funatsu et al. | |
| 9,676,654 | B2 | 6/2017 | Gabel et al. | |
| 10,087,100 | B2 | 10/2018 | Ikemoto et al. | |
| 10,252,930 | B2 * | 4/2019 | Kato | C03B 35/145 |
| 10,453,710 | B2 * | 10/2019 | Kim | H01L 21/67092 |
| 10,759,689 | B2 | 9/2020 | Chau et al. | |
| 11,584,674 | B2 | 2/2023 | Yoo et al. | |
| 2004/0016280 | A1 * | 1/2004 | Ishihara | B21D 37/16 |
| | | | | 72/342.1 |
| 2004/0244458 | A1 * | 12/2004 | Yamano | B21D 5/01 |
| | | | | 72/350 |
| 2004/0256397 | A1 * | 12/2004 | Nakazato | B29C 51/343 |
| | | | | 220/628 |
| 2005/0025564 | A1 * | 2/2005 | Humpert | F16B 37/065 |
| | | | | 403/282 |
| 2012/0297853 | A1 * | 11/2012 | Tanaka | B21D 22/22 |
| | | | | 72/350 |
| 2013/0312261 | A1 * | 11/2013 | Godon | F01D 5/147 |
| | | | | 29/889.71 |
| 2014/0295205 | A1 * | 10/2014 | Ota | C21D 1/673 |
| | | | | 72/342.2 |
| 2015/0153148 | A1 * | 6/2015 | Angerer | B21D 5/16 |
| | | | | 72/379.2 |
| 2015/0246384 | A1 * | 9/2015 | Ikeda | B21D 51/26 |
| | | | | 72/347 |
| 2015/0352774 | A1 * | 12/2015 | Iwano | B29C 70/46 |
| | | | | 425/395 |
| 2016/0288184 | A1 * | 10/2016 | Zhao | B21D 5/02 |
| 2016/0311717 | A1 * | 10/2016 | Nieber | C03B 23/02 |
| 2017/0121210 | A1 | 5/2017 | Rai et al. | |
| 2017/0246849 | A1 * | 8/2017 | Ilinich | B32B 37/06 |
| 2017/0264176 | A1 * | 9/2017 | Bernot | H02K 1/145 |
| 2017/0349472 | A1 * | 12/2017 | Jung | C03B 23/0302 |
| 2018/0154417 | A1 * | 6/2018 | Hirata | B21D 13/02 |
| 2018/0155238 | A1 * | 6/2018 | Kim | C03C 21/002 |
| 2018/0327301 | A1 * | 11/2018 | Fujii | C03B 23/0252 |
| 2019/0173030 | A1 | 6/2019 | Kim et al. | |
| 2019/0187757 | A1 | 6/2019 | Choi et al. | |
| 2019/0248692 | A1 | 8/2019 | Hwang et al. | |
| 2019/0276347 | A1 * | 9/2019 | Shim | C03B 23/0307 |
| 2019/0302850 | A1 * | 10/2019 | Park | H04M 1/0268 |
| 2019/0329309 | A1 * | 10/2019 | Suzuki | C21D 9/0068 |
| 2019/0351472 | A1 * | 11/2019 | Lakshman | B21D 22/26 |
| 2020/0075885 | A1 | 3/2020 | Jiang | |
| 2020/0079676 | A1 * | 3/2020 | Boisselle | C03B 23/023 |
| 2020/0137471 | A1 * | 4/2020 | Yee | H04R 1/086 |
| 2020/0229312 | A1 * | 7/2020 | Ha | G06F 1/1681 |
| 2020/0234616 | A1 * | 7/2020 | Ha | H04M 1/0268 |
| 2020/0311325 | A1 * | 10/2020 | Tanaka | B21D 22/00 |
| 2020/0318487 | A1 * | 10/2020 | Okamoto | F01D 9/06 |
| 2020/0338804 | A1 * | 10/2020 | Kim | B29C 53/80 |
| 2020/0346269 | A1 * | 11/2020 | Tobita | C21D 9/46 |
| 2020/0350509 | A1 * | 11/2020 | Sim | B32B 27/281 |
| 2020/0398328 | A1 * | 12/2020 | Miyake | B21D 22/20 |
| 2021/0023600 | A1 * | 1/2021 | Sato | B21D 5/10 |
| 2021/0197321 | A1 * | 7/2021 | Mansuino | B29C 51/14 |

FOREIGN PATENT DOCUMENTS

| | | |
|---|---|---|
| CN | 110587956 A | 12/2019 |
| JP | 2004306460 A | 11/2004 |
| JP | 2012520225 A | 9/2012 |
| JP | 2014097911 A | 5/2014 |
| KR | 101163568 | 7/2012 |
| KR | 20140087548 | 7/2014 |
| KR | 101451207 | 10/2014 |
| KR | 101483222 | 1/2015 |
| KR | 101537811 | 7/2015 |
| KR | 101585633 | 1/2016 |
| KR | 101597526 | 2/2016 |
| KR | 20160025685 | 3/2016 |
| KR | 101638579 | 7/2016 |
| KR | 101721082 | 3/2017 |
| KR | 20180038610 | 4/2018 |
| KR | 20180074780 | 7/2018 |
| KR | 20180076419 | 7/2018 |
| KR | 101893830 | 8/2018 |
| KR | 101892388 | 9/2018 |
| KR | 101904825 | 10/2018 |
| KR | 20190071854 | 6/2019 |
| KR | 20190098284 | 8/2019 |
| KR | 102025686 | 9/2019 |
| KR | 101996309 | 10/2019 |
| KR | 102051147 | 12/2019 |
| KR | 1020200063653 A | 6/2020 |
| WO | 2014097830 A1 | 6/2014 |
| WO | 2018199402 A1 | 11/2018 |
| WO | WO-2019189873 A1 * | 10/2019 ............... B21D 5/01 |

\* cited by examiner

WINDOW MOLDING APPARATUS AND WINDOW MOLDING METHOD USING THE SAME

CROSS-REFERENCE TO RELATED APPLICATIONS

This application claims priority from and the benefit of Korean Patent Application No. 10-2020-0072550, filed on Jun. 15, 2020, which is hereby incorporated by reference for all purposes as if fully set forth herein.

BACKGROUND

Field

Implementations of the invention relate generally to a window molding apparatus and a window molding method using the same, and, more specifically, to a window molding apparatus for manufacturing a window having a bent portion that is bent at a large bending angle and a window molding method using the same.

Discussion of the Background

An electronic device includes a window, a housing, and electronic elements. The electronic elements include various elements (e.g., a display element, a touch element, or a detection element) that are activated according to electrical signals. Generally, the window is disposed on the electronic elements to protect the electronic elements and provide an active area (e.g., a display area, a touch area) to a user. Thus, the user may provide an input to the electronic elements or receive information generated in the electronic elements through the window. In addition, the window may stably protect electronic elements against external impacts.

Recently, a curved display device or bendable display device, which displays an image through each of a front surface, a rear surface, side surfaces has been developed.

The above information disclosed in this Background section is only for understanding of the background of the inventive concepts, and, therefore, it may contain information that does not constitute prior art.

SUMMARY

Applicant realized that, with the advent of curved and bendable display devices, it beneficial to develop a window processing technology having various shapes, which is capable of being used for various types of display devices.

Window molding apparatus constructed according to the principles and embodiments of the invention and methods for molding windows for electronic devices using the same are capable of manufacturing a window having a bent portion that is bent at a large bending angle. For example, the window molding apparatus may include a molding jig having a groove into which a portion of a bendable window member to be processed is inserted.

Additional features of the inventive concepts will be set forth in the description which follows, and in part will be apparent from the description, or may be learned by practice of the inventive concepts.

According to one aspect of the invention, a window molding apparatus for processing a member having first and second opposed, substantially flat sides and a bendable portion disposed therebetween, the apparatus includes: a first molding part controlled to move in a substantially linear direction; and a jig including a support surface on which the member to be processed is seated and a recess in the support surface to receive the bendable portion of the member and the first molding part.

The first molding part may be configured to be: spaced apart from the jig with the member therebetween when the member is in a first state in which the first and second opposed, substantially flat sides and the bendable portion are substantially flat; and inserted at least partially into the groove, in a second state in which the bendable portion is concavely bent in a longitudinal direction of the groove.

The first molding part may include a core molding part having a bent molding portion and a substantially flat molding portion, and, in the first state, the bent portion may be configured to be adjacent to the bent molding portion, and each of the first substantially flat portion and the second substantially flat portion may be configured to be spaced apart from the substantially flat molding portion, and in the second state, the bent portion may be configured to contact the bent molding portion, and the first substantially flat portion and the second substantially flat portion may be configured to be adjacent to the substantially flat molding portion.

The window molding apparatus may further include a first heater to provide heat to the jig. The first heater may be disposed to surround the groove.

The window molding apparatus may further include a second heater having a through-hole to receive the first molding part.

The second heater may be controlled to move in the substantially linear direction so that the first molding part is disposed in the through-hole.

The first heater may include a jig heating part and the second heater may include a core heating part, and at least one of which may include an induction heating coil.

The window molding apparatus may further include a pressing part disposed on the first molding part and controlled to move in the substantially linear direction.

The jig may include a molding jig including: a bent portion jig in which the groove is defined; a first support disposed at one side of the bent portion jig; and a second support disposed at the other side of the bent portion jig.

According to another aspect of the invention, a window molding apparatus for a member, the apparatus includes: a first molding part movable in a substantially linear direction and including a bent molding portion and a substantially flat molding portion; and a jig including a support surface on which the member is seated and a recess in the support surface to receive a portion of the member and the bent molding portion. The recess includes a bent surface and first and second opposed, substantially flat surfaces with the bent surface disposed therebetween.

When the first molding part is inserted into the groove, the first substantially flat surface and the second substantially flat surface may be spaced a first distance from each other with the first molding part disposed therebetween.

The substantially flat molding portion may include a first substantially flat molding surface and a second substantially flat molding surface, the bent surface may be spaced apart from the bent molding portion to face the bent molding portion, and the first substantially flat surface and the second substantially flat surface may face each other and are spaced apart from the first substantially flat molding surface and the second substantially flat molding surface, respectively.

According to still another aspect of the invention, a window molding apparatus includes: a first molding part movable in a substantially linear direction; a first heater movable in the substantially linear direction and disposed adjacent to the first molding part; a jig including a bent portion having a recess to receive the first molding part, and first and second supports respectively disposed on both sides of the bent portion; and a second heater disposed adjacent to the bent portion.

The first molding part may include a core molding part including a bent molding portion and a substantially flat molding portion, and the bent molding portion may include a curved surface having a radius of curvature of about 1 mm to about 10 mm.

The recess may include a bottom surface having a curved surface with a shape generally corresponding to that of the bent molding portion.

The first heater may have a through-hole to receive the core molding part.

The first heater may be movable in the substantially linear direction so that the core molding part is disposed in the through-hole.

The second heater may surround the bent portion.

The window molding apparatus may further include a pressing part movable in the substantially linear direction and disposed on the first molding part.

A member to be processed may be disposed between the first molding part and the jig, in a first state in which the member is substantially flat, the first molding part may be spaced apart from the jig with the member therebetween, and in a second state in which a portion of the member is concavely bent in a longitudinal direction of the recess, at least a portion of the first molding part may be inserted into the recess.

According to still yet another aspect of the invention, a method of molding a window using a window molding apparatus including a first molding part and a jig including a surface and a recess therein, the method includes the steps of: disposing a window member to be processed between the first molding part and the jig; and allowing the first molding part to move so that the first molding part is inserted into the groove with the window member to be processed therebetween. The member to be processed includes a first portion, a second portion, and a third portion disposed between the first portion and the second portion, and the step of allowing the core molding part to move includes molding the first portion and the second portion so that the first portion and the second portion, which are inserted into the recess, face each other with the first molding portion therebetween.

The window member to be processed may be a glass substrate, and the step of molding the window member may include heating to the window member to a temperature so that it has viscosity of about $10^7$ poise to about $10^9$ poise.

The third portion may include a bent portion, the first portion may include a first, substantially flat portion disposed at one side of the bent portion, and the second portion may include a second, substantially flat portion disposed at the other side of the bent portion.

The step of allowing the first molding part to move may include pressing the window member at a pressure of about a 10 psi to about 100 psi.

The method may further include the step of heating the jig to mold the window member when it is inserted into the recess.

In the step of molding the window member, an outer side of the window member adjacent to the recess may have a temperature greater than that of an inner side of the window member adjacent to the first molding part.

In the step of molding the window member, the temperature of the jig may be maintained greater than that of the first molding part.

The jig may include a molding jig having a bent portion jig in which the groove is defined, a first support disposed at one side of the bent portion jig, and a second support disposed at the other side of the bent portion jig, and the step of molding the window member may include heating the bent portion jig so that the window member has viscosity of about $10^7$ poise to about $10^9$ poise.

The method may further include, after the molding the window member, cooling the window member.

The step of cooling the window member may include inserting the window member into a mold having a shape corresponding to that of the window member.

After the step of cooling the window member, the first portion and the second portion may be maintained in substantially parallel configuration.

The method may further include, after the step of the cooling the window member, chemically toughening the window member.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1A:
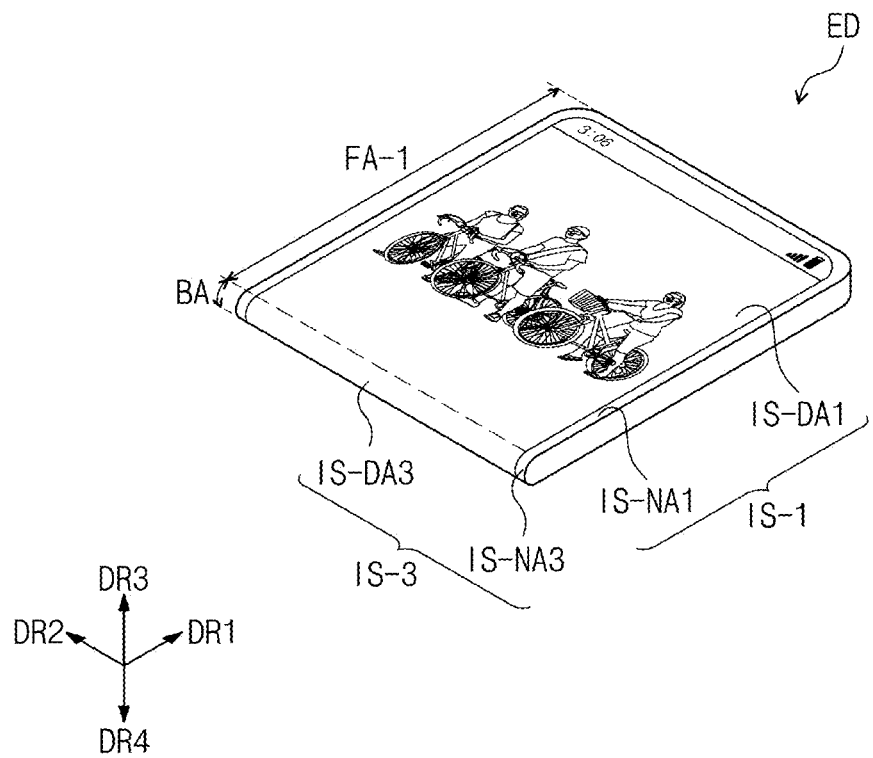
FIGS. 1A and 1B are perspective views of an embodiment of an electronic device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
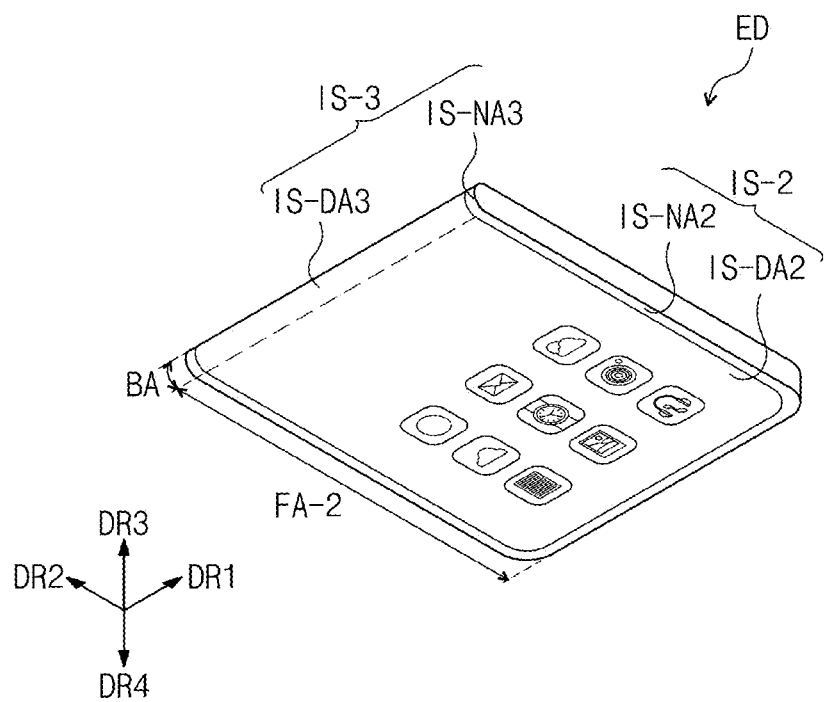

FIGS. 1A and 1B are perspective views of an embodiment of an electronic device constructed according to the principles of the invention. An electronic device ED may include a plurality of display surfaces IS-1, IS-2, and IS-3. The electronic device ED may display an image on the plurality of display surfaces IS-1, IS-2, and IS-3. FIGS. 1A and 1B are perspective views of the electronic device ED when viewed on from above and below, respectively. FIG. 1A is a perspective view of the electronic device ED when viewed in a third direction DR3, and FIG. 1B is a perspective view of the electronic device ED when viewed in a fourth direction DR4.

In FIGS. 1A and 1B and the following figures, the first to fourth direction axes DR1 to DR4 are illustrated, and directions indicated by the first to fourth direction axes DR1, DR2, DR3, and DR4, which are described in this specification are relative concepts and thus may be changed into different directions.

In this specification, the first directional axis DR1 and the second directional axis DR2 may be perpendicular to each other, and the third directional axis DR3 and the fourth directional axis DR4 may be normal directions with respect to a plane defined by the first direction DR1 and the second direction DR2. The third direction axis DR3 and the fourth direction axis DR4 may be directions that extend in directions opposite to each other.

Also, an X-axis X, a Y-axis Y, and a Z-axis Z are illustrated in this specification, and in this specification. In this specification, for convenience of description, a direction of the Z-axis Z is defined as an upward direction. Further, the X-axis X and the Y-axis Y may be perpendicular to each other, and the direction of the Z-axis Z may be a normal direction with respect to a plane defined by the X-axis X and the Y-axis Y.

The electronic device ED may be a device that is activated according to an electrical signal. The electronic device ED may include various examples. For example, the electronic device ED may include a tablet, a notebook, a computer, a smart television, and the like. In this illustrated embodiment, an electronic device ED including a smart phone will be described as an example.

The electronic device ED includes a first flat area FA-1 including a first display surface IS-1, a second flat area FA-2 including a second display surface IS-2, and a bent area BA including the third display surface IS-3. The bent area BA may be a portion disposed between the first flat area FA-1 and the second flat area FA-2. In FIGS. 1A and 1B, although the bent area BA is illustrated as having a curved surface, the embodiment is not limited thereto. For example, the bent area BA may be disposed between the first flat area FA-1 and the second flat area FA-2 and have angled corners to form a generally staple-type shape. The first flat area FA-1 and the second flat area FA-2 may be spaced apart and face each other in the direction of the third direction axis DR3.

The first display surface IS-1 may include a first display area IS-DA1 and a first peripheral area IS-NA1 adjacent to the first display area IS-DA1. The second display surface IS-2 includes a second display area IS-DA2 and a second peripheral area IS-NA2 adjacent to the second display area IS-DA2, and the third display surface IS-3 may include a third display area IS-DA3 and a third peripheral area IS-NA3 adjacent to the third display area IS-DA3. In this specification, each of the display areas IS-DA1, IS-DA2, and IS-DA3 is defined as an area on which an actual image is displayed, and each of the peripheral areas IS-NA1, IS-NA2, IS-NA3 is defined as an area on which an image is not displayed. Each of the peripheral areas IS-NA1, IS-NA2, and IS-NA3 may be provided in various colors through a printed layer. However, the embodiments are not limited thereto, and at least a portion of the peripheral areas IS-NA1, IS-NA2, and IS-NA3 may be omitted.

The first display surface IS-1 may be substantially parallel to a plane defined by the first direction axis DR1 and the second direction axis DR2. The first display surface IS-1 may be a substantially flat surface when viewed on the plane. As used herein, the meaning of "when viewed on the plane or in the plan view" may mean a case when viewed in the direction of the third directional axis DR3 or the fourth direction axis DR4. A front surface (or a top surface) and a rear surface (or a bottom surface) of each of layers or units, which will be described below, are distinguished by the third directional axis DR3. The first display area IS-DA1 of the first display surface IS-1 may provide an image in the direction of the third direction axis DR3.

Also, in the electronic device ED, the second display surface IS-2 may be substantially parallel to the plane defined by the first direction axis DR1 and the second direction axis DR2. The second display surface IS-2 may be a flat surface when viewed on the plane. The second display surface IS-2 may be substantially parallel to the first display surface IS-1. The second display area IS-DA2 of the second display surface IS-2 may provide an image in the direction of the fourth direction axis DR4.

The third display surface IS-3 may be a portion disposed between the first display surface IS-1 and the second display surface IS-2, and each of the first display surface IS-1 and the second display surface IS-2 may be a portion that is bent at an angle of about 180° with respect to the third display surface IS-3. The third display area IS-DA3 of the third display surface IS-3 may provide an image in a direction between the third directional axis DR3 and the fourth directional axis DR4. The first display surface IS-1 and the second display surface IS-2 may be spaced apart from each other with the third display surface IS-3 therebetween in the direction of the third directional axis DR3 or the fourth directional axis DR4. The third display surface IS-3 may have a curved shape that is convex outwardly. However, the embodiments are not limited thereto. The third display surface IS-3 may be a substantially flat surface. Alternatively, unlike this, the curved surface of the third display surface IS-3 may have a half-elliptic shape in a cross-section substantially parallel to the surface defined by the first direction axis DR1 and the third direction axis DR3, or the third display surface IS-3 may have both a curved surface and a substantially flat surface. The third display surface IS-3 may provide an image in a direction different from the direction in which the first display surface IS-1 and the second display surface IS-2 provide an image and may be provided in various shapes in the form including a bent portion between the first display surface IS-1 and the second display surface IS-2.

Each of the first to third display areas IS-DA1, IS-DA2, and IS-DA3 may display different images. The images displayed on the first to third display areas IS-DA1, IS-DA2, and IS-DA3 may be the same one image or different images. Also, the images displayed from each of the first to third display areas IS-DA1, IS-DA2, and IS-DA3 may be connected to each other to display one unitary image. Each of the first to third display areas IS-DA1, IS-DA2, and IS-DA3 may be controlled independently of each other.

Figure 2:
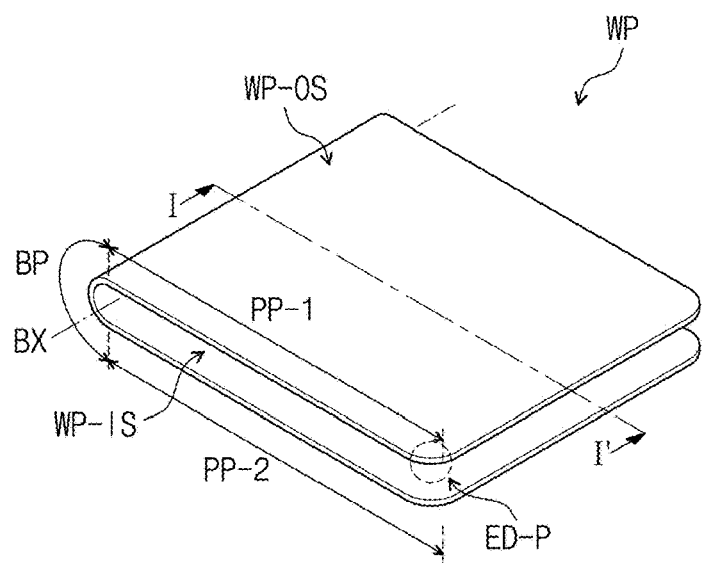
FIG. 2 is a perspective view of an embodiment of a bendable window constructed according to the principles of the invention.
Figure 2:
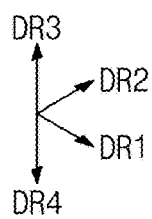
Figure 3:
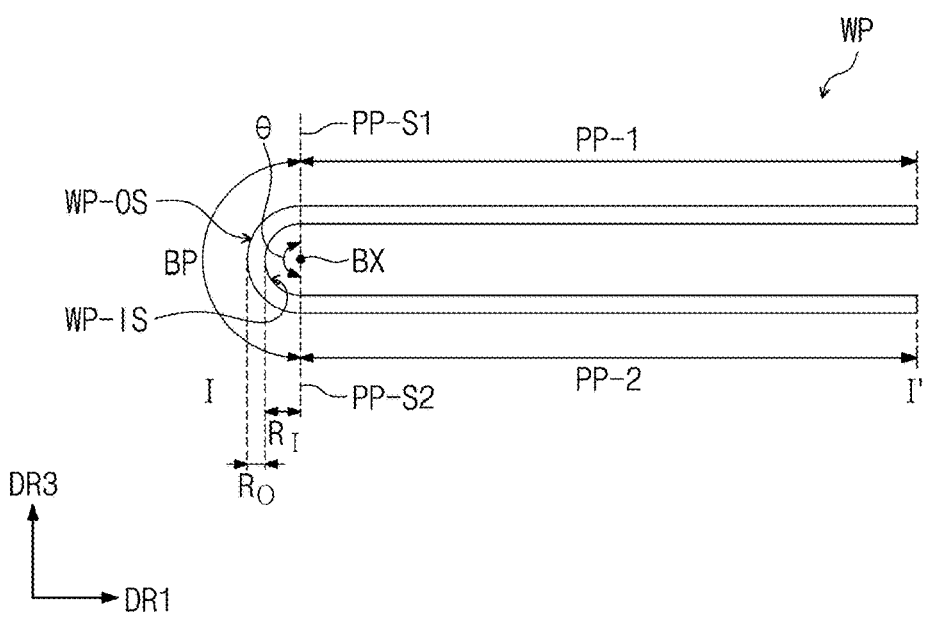
FIG. 3 is a cross-sectional view of the window taken along line I-I' of FIG. 2.

FIG. 2 is a perspective view of an embodiment of a window constructed according to the principles of the invention, and FIG. 3 is a cross-sectional view of the window taken along line I-I' of FIG. 2.

The window WP illustrated in FIGS. 2 and 3 may be provided in the electronic device ED (see FIG. 1A) illustrated in FIGS. 1A and 1B. The window WP may correspond to the uppermost layer of the electronic device ED. The window WP may be a tempered glass substrate subjected to a tempered treatment. A display module may be attached to an inner side WP-IS of the window WP, and an outer side WP-OS of the window WP may be the display surfaces IS-1, IS-2, and IS-3 (see FIG. 1A). The window WP may include a reinforced surface to stably protect the display module from an external impact.

The window WP may include a first portion, a second portion, and a third portion disposed between the first portion and the second portion. The third portion may be disposed between the first portion and the second portion and include a bent portion. The third portion may be a portion including a curved surface or a substantially flat surface.

Hereinafter, in this specification, the third portion BP may be referred to as a bent portion BP, and the first portion PP-1 and the second portion PP-2 may be referred to as a first flat portion PP-1 and a second flat portion PP-2, respectively. All of the flat portions described herein may be substantially flat due to manufacturing tolerances and the like. The window WP may include the bent portion BP and the first and second flat portions PP-1 and PP-2, which are disposed on both sides of the bent portion BP. The window WP may further include a printed layer disposed at an edge of the inner side WP-IS or the outer side WP-OS. For example, the printed layer may be a portion corresponding to the peripheral areas IS-NA1, IS-NA2, and IS-NA3, FIGS (see FIGS. 1A and 1B).

Referring to FIGS. 2 and 3, in the window WP, the bent portion BP may be a portion that is bent with respect to a bending axis BX extending in one direction substantially parallel to the second directional axis DR2. In the window WP, the first flat portion PP-1 and the second flat portion PP-2 disposed with the bent portion BP therebetween may face each other in a substantially parallel configuration. However, the embodiments are not limited thereto, and an extension surface of the first flat portion and an extension surface of the second flat portion may not be parallel to each other. For example, the extension surface of the first flat portion PP-1 and the extension surface of the second flat portion PP-2 may be gradually close to each other in the first directional axis DR1 that is an extending direction of the extension surface or may be gradually spaced apart from each other in the first directional axis DR1 that is the extending direction.

The window WP may be substantially rigid. The window WP may be fixed in a manner in which the first flat portion PP-1 and the second flat portion PP-2 face each other so as to be spaced apart from each other with the bent portion BP therebetween.

In FIGS. 2 and 3, the first flat portion PP-1 and the second flat portion PP-2 facing each other have substantially the same surface area, but the embodiments are not limited thereto. The first flat portion PP-1 and the second flat portion PP-2 disposed with the bent portion BP therebetween may have surface areas different from each other (see FIGS. 4 and 5). Also, in FIGS. 2 and 3, the shapes of the first flat portion PP-1 and the second flat portion PP-2 facing each other are illustrated to be generally symmetrical with respect to the bent portion BP, but the embodiments are limited thereto. For example, the shapes of the first flat portion PP-1 and the second flat portion PP-2 may be different from each other (see FIGS. 4 and 5).

In the window WP, the bent portion BP may be defined as a portion between a portion at which the first flat portion PP-1 starts and a portion at which the second flat portion PP-2 starts. In an embodiment, the bent portion BP may be a portion of a circle having a predetermined radius of curvature in cross-section or a portion of an ellipse in cross-section. Also, the bent portion BP may include both a curved surface and a flat surface.

As used herein, a bending angle θ of the bent portion BP may be defined as an angle that is angled between a point PP-S1 at which the first flat portion PP-1 starts and a point PP-S2 at which the second flat portion PP-2 starts. The bending angle θ in the window WP illustrated in FIGS. 2 and 3 may be about 180°.

The bending angle θ in the window WP, which is manufactured by the window molding apparatus, may be greater than about 120°. That is, the window WP may be bent at the bending angle θ greater than about 120°. Also, the bending angle θ in the window WP may be greater than about 180°. For example, the bending angle θ may be about 180° or more and may be less than an angle within a range in which the two flat portions PP-1 and PP-2 do not meet each other.

In FIG. 2, in the window WP, four corner edges ED-P of the window WP are illustrated as being curved, but the embodiments are not limited thereto. At least one of the corner edges ED-P of the window WP may have a right angle shape on the plane defined by the first direction axis DR1 and the second direction axis DR2. For example, each of the corner edges ED-P of the window WP may have a radius of curvature of about 0.1 mm to about 15 mm.

In an embodiment, the corner edges ED-P of the window WP may be a flat surface substantially parallel to the plane defined by the first and second directional axes DR1 and DR2. However, the embodiments are not limited thereto, and the corner edges ED-P may include portions bent in the direction of the fourth directional axis DR4. The corner edges ED-P may have one bent portion corresponding to a corner portion or may have two or four bent portions around the corner portion.

The window WP may include the bent portion BP bent with respect to the bending axis BX, and the bent portion BP may have a radius of curvature of about 1 mm to about 10 mm. The inner side of the window WP-IS may have a radius of curvature RI less than a radius of curvature RO of the outer side WP-OS of the window.

Figure 4A:
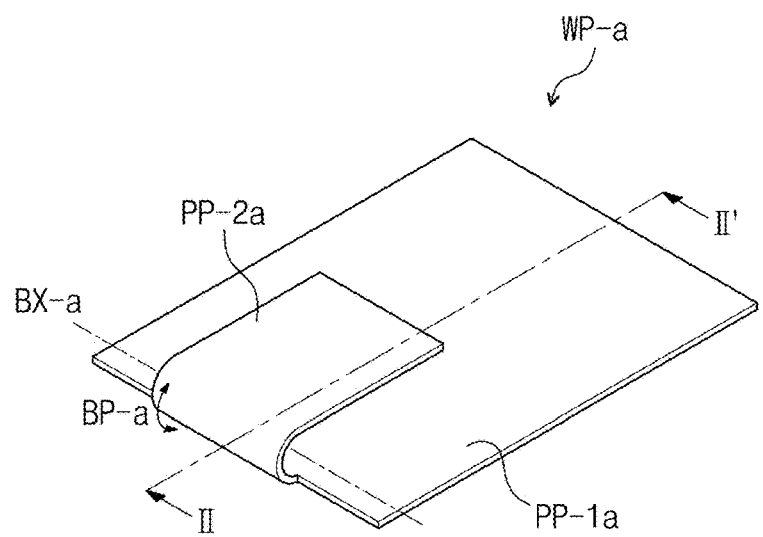
FIG. 4A is a perspective view of another embodiment of a window constructed according to the principles of the invention.
Figure 4A:
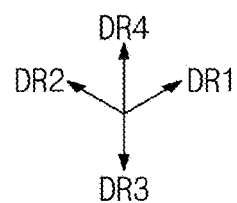
Figure 4B:
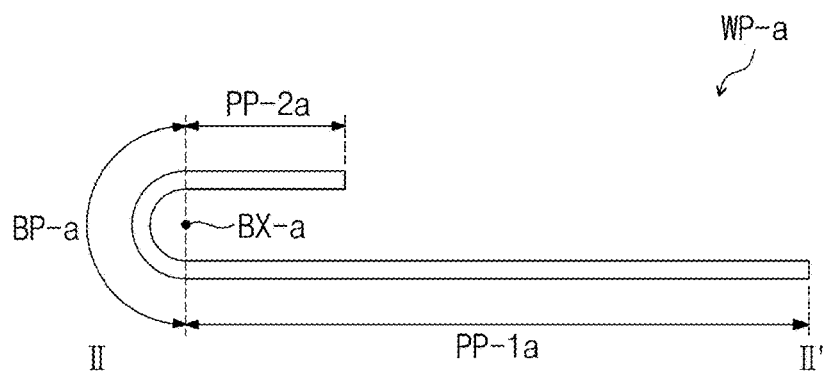
FIG. 4B is a cross-sectional view of the window taken along line II-IF of FIG. 4A.
Figure 4B:
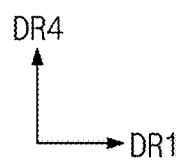

FIG. 4A is a perspective view of another embodiment of a window constructed according to the principles of the invention, and FIG. 4B is a cross-sectional view of the window taken along line II-IF of FIG. 4A. Referring to FIGS. 4A and 4B, a window WP-a may include a first flat portion PP-1a and a second flat portion PP-2a, which face each other in the direction of the third directional axis DR3 or the fourth directional axis DR4 and a bent portion BP-a disposed between the first flat portion PP-1a and the second flat portion PP-2a. In the window WP-a, the first flat portion PP-1a and the second flat portion PP-2a may have different surface areas. The second flat portion PP-2a may overlap only a portion of the first flat portion PP-1a. The first flat portion PP-1a may have a surface area greater than that of the second flat portion PP-2a. In FIGS. 4A and 4B, the second flat portion PP-2a is illustrated to be disposed at a central portion of the first flat portion PP-1a, but the embodiments are not limited thereto. For example, in the window WP-a, the second flat portion PP-2a may be lean to one side of the first flat portion PP-1a.

In the windows WP and WP-a illustrated in FIGS. 2 to 4B, the bending axes BX and BX-a are illustrated substantially parallel to each other in the direction of the second directional axis DR2, which is a short side direction of each of the windows WP and WP-a, but the embodiments are not limited thereto. Unlike this, the windows WP and WP-a may include bent portions BP and BP-a that are bent with respect to bending axes BX and BX-a substantially parallel to the direction of the first directional axis DR1 that is the long side direction. Also, the shapes of the windows WP and WP-a are not limited to those illustrated in this specification, and the ratio of the long side and the short side may be changed differently from those illustrated in the drawings.

The shape of the window manufactured by the window molding method using the window molding apparatus is not limited to that illustrated in FIGS. 1 to 4B. In FIGS. 2 to 4B, a case in which the bending angle θ is about 180° is illustrated, but the embodiments are not limited thereto. For example, the window includes a bent portion bent at a large bending angle of about 120° or more. Here, the window may be provided in various shapes in addition to the shape disclosed in this specification as long as the flat portion is provided at each of both sides with respect to the bent portion.

Figure 5:
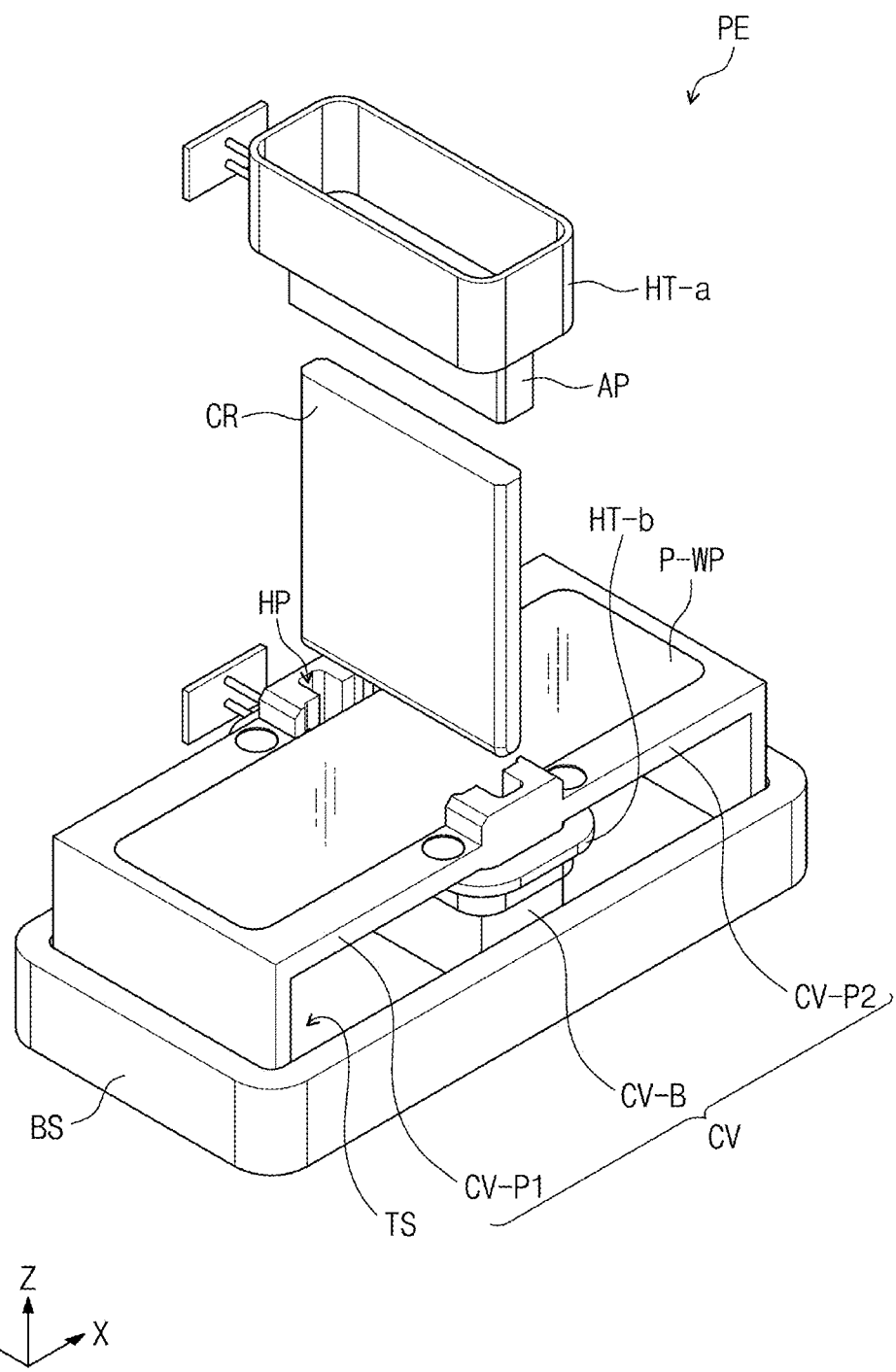
FIG. 5 is a perspective view of an embodiment of a window molding apparatus constructed according to the principles of the invention.
Figure 6:
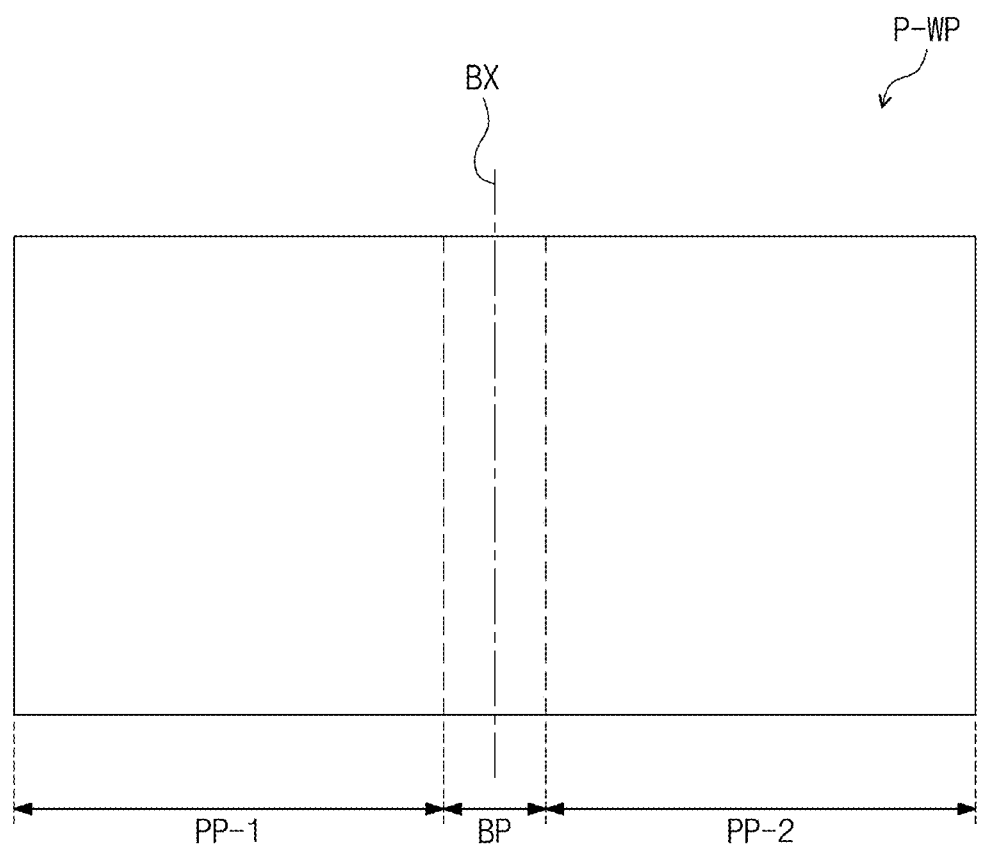
FIG. 6 is a plan view of a preliminary window member to be processed using the window molding apparatus of FIG. 5.
Figure 7:
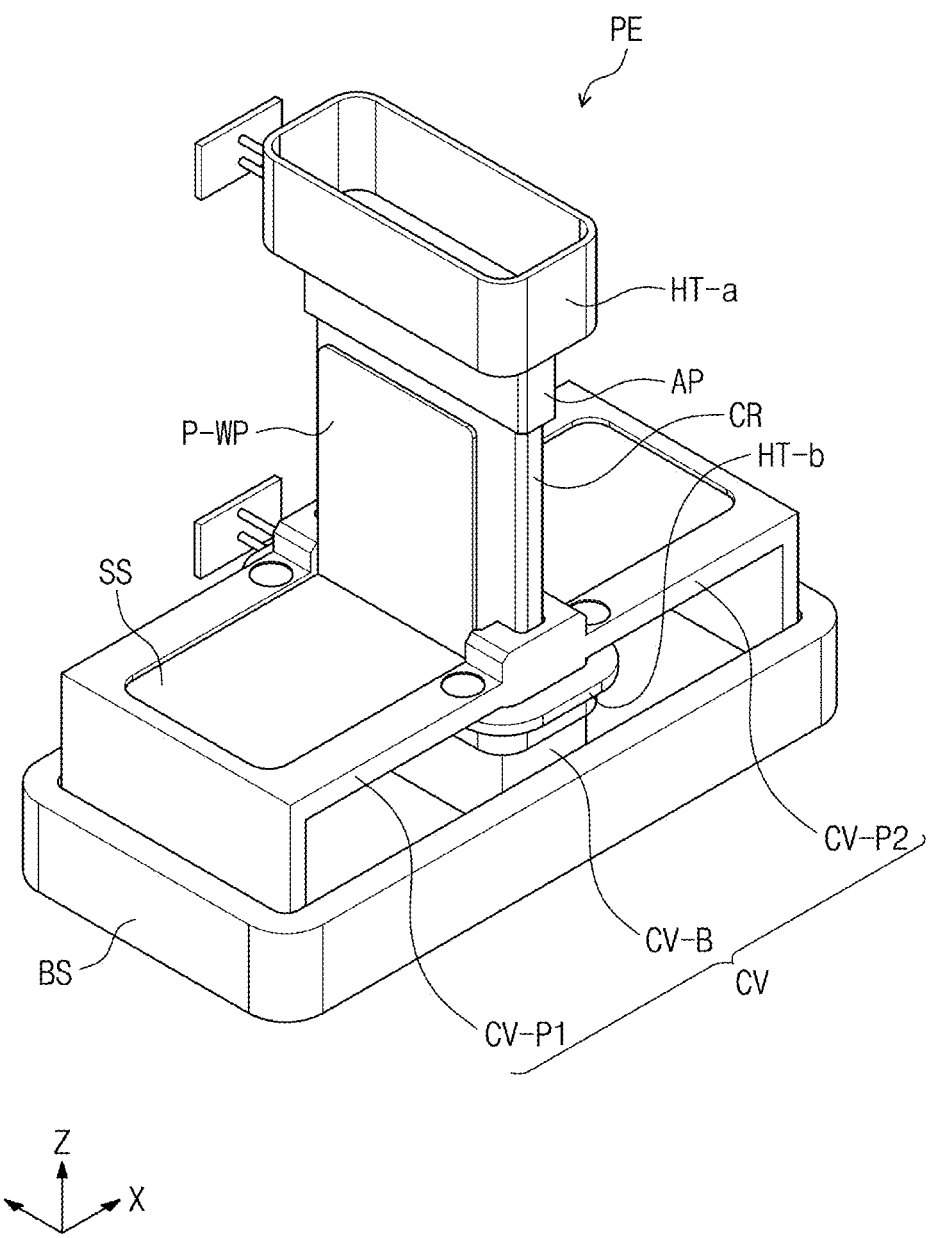
FIG. 7 is a perspective view illustrating another operating state of the window molding apparatus of FIG. 5.
Figure 8:
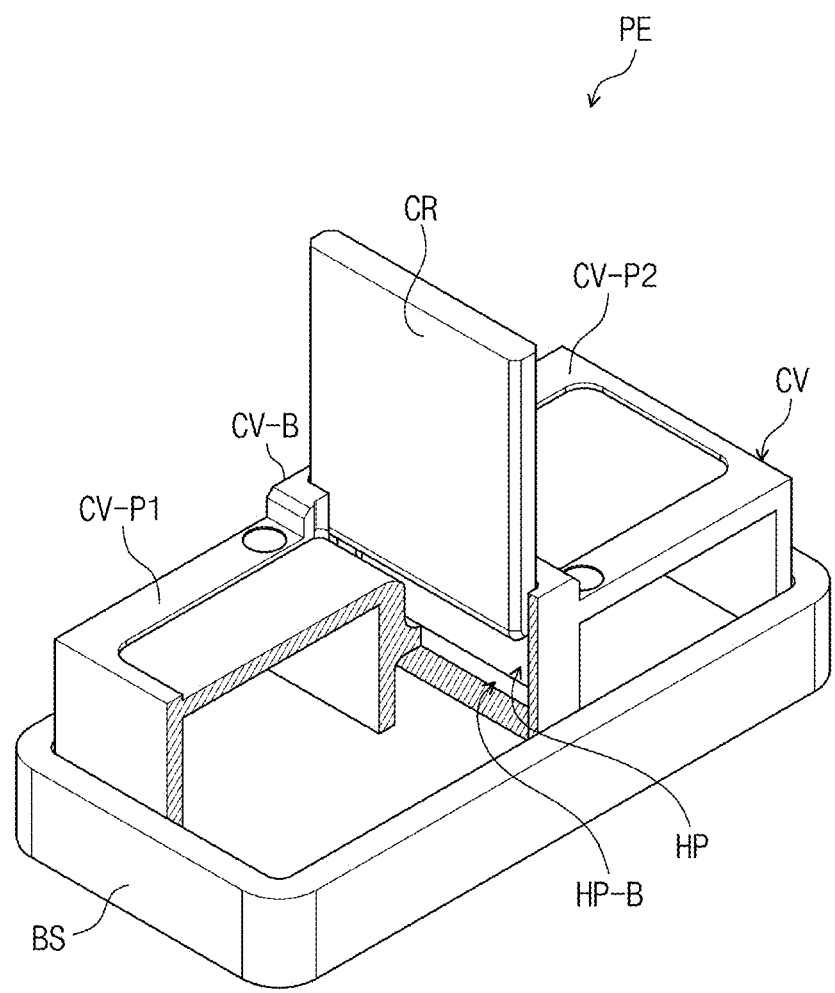
FIG. 8 is a perspective view showing a cross-sectional shape of the window molding apparatus of FIG. 5. after certain portions have been cut for illustration

FIG. 5 is a perspective view of an embodiment of a window molding apparatus constructed according to the principles of the invention, and FIG. 7 is a perspective view illustrating another operating state of the window molding apparatus of FIG. 5. FIG. 6 is a plan view of a preliminary window member to be processed, which is provided to the window molding apparatus of FIG. 5. FIG. 8 is a perspective view showing a cross-sectional shape of the window molding apparatus of FIG. 5 after certain portions have been cut for illustration. FIG. 8 exemplarily illustrates a portion of the window molding apparatus in one process of the window molding method.

The ratio of the sizes of the members in a window molding apparatus PE is not limited to the illustrated embodiments. For example, the height ratio of a core heating part HT-a and a core molding part CR and the height ratio of a jig heating part HT-b and a molding jig CV may be changed differently from the ratios illustrated in the drawings.

The member P-WP to be processed, which is illustrated in FIG. 6, corresponds to a preliminary window that is a window before molding the window to its bent shape. The member P-WP to be processed by the window molding apparatus PE may be a glass substrate. The glass substrate that is the member P-WP to be processed may have a thickness of about 0.1 mm to about 1.0 mm. The window molding apparatus PE may provide the window WP (see FIG. 2) that is bent at a bending angle greater than about 120° by processing the member P-WP to be processed, which is the glass substrate. For example, referring to FIG. 6, the member to be processed P-WP comprises the bendable portion BP and first and second flat portions PP-1 and PP-2, which are respectively disposed on both sides of the bendable portion BP.

Referring to FIG. 5, the window molding apparatus PE may include a core molding part CR and a molding jig CV. The core molding part CR may be controlled to operate in a linear (e.g., vertical) direction. As used herein, the control of the operation in the vertical direction means an operation in an upward (up) or downward (down) direction with respect to a Z-axis Z. The molding jig CV may include a bent portion jig CV-B, a first support CV-P1, and a second support CV-P2.

The window molding apparatus PE may include a support table BS, and the molding jig CV may be fixed on the support table BS. A top surface TS of the support table BS on which the molding jig CV is disposed may be substantially parallel to a plane defined by an X-axis X and a Y-axis Y. The Z-axis Z may indicate a normal direction to the plane defined by the X-axis X and the Y-axis Y.

The window molding apparatus PE may be disposed in a chamber. An inert gas may be provided into the chamber. For example, an $N_2$ gas may be provided into the chamber. Also, the molding of the window may be performed by increasing the atmosphere temperature within the chamber through the window molding method that will be described later.

FIG. 5 is a view illustrating an operation state of the window molding apparatus PE before the member P-WP to be processed is molded, and FIG. 7 is a view illustrating a state of the window molding apparatus PE in a process of bending the member to be processed so as to be molded into the window WP. FIG. 8 is a view illustrating a portion of the window molding apparatus PE including the support table BS, the molding jig CV, and the core molding part CR. FIG. 8 illustrates a cross-sectional view of a state in which portions of a bent portion jig CV-B and a first support CV-P1 are cut to show a cross-sectional shape of the molding jig CV. As shown in FIG. 8, the bent portion jig CV-B may include a groove HP recessed downward, and the bottom surface HP-B of the groove HP may have a shape corresponding to that of the bent portion BP to be molded.

Referring to FIGS. 5 to 8, in the window molding apparatus PE, the core molding part CR may be controlled in operation in a direction substantially parallel to the Z-axis Z. That is, the core molding part CR may operate in an upward direction that is away from the support table BS and in a downward direction that is closer to the support table BS.

Figure 9:
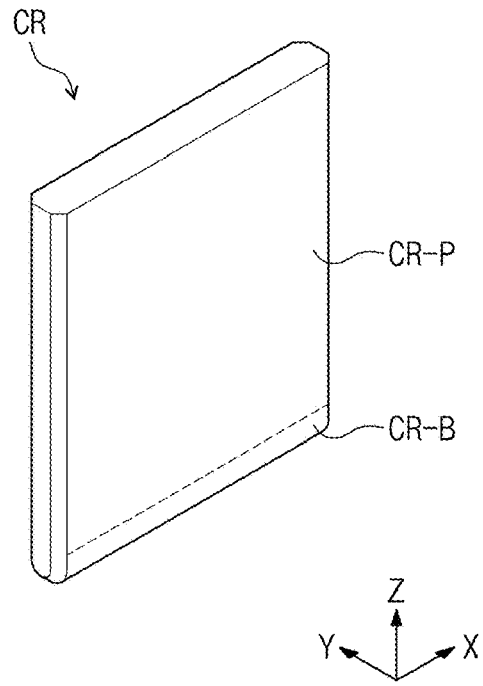
FIG. 9 is a perspective view of a core molding part in the window molding apparatus of FIG. 5.
Figure 10:
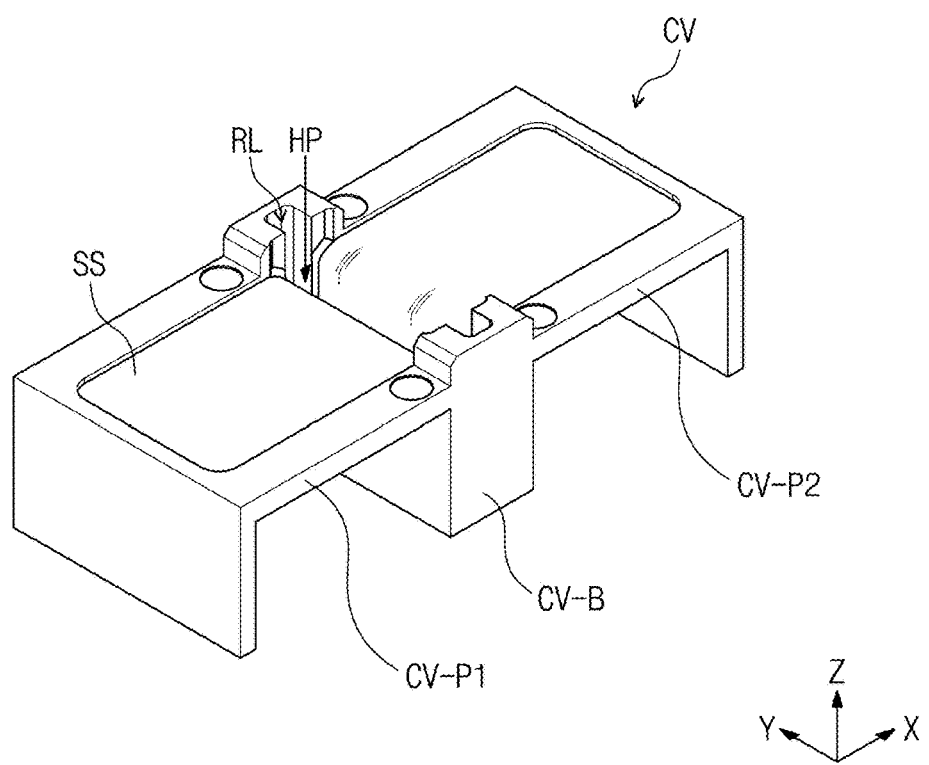
FIG. 10 is a perspective view of a molding jig in the window molding apparatus of FIG. 5.
Figure 11:
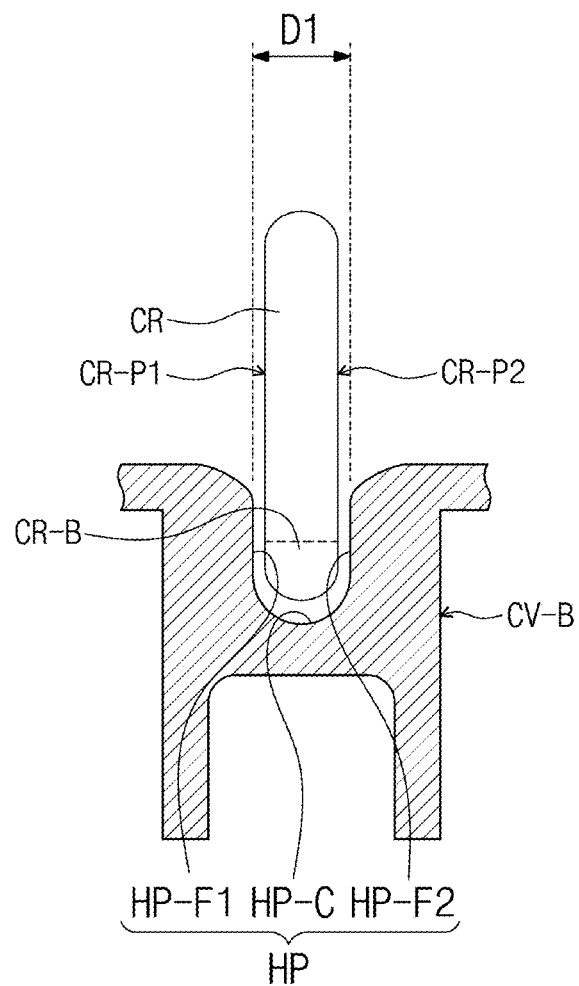
FIG. 11 is a cross-sectional view illustrating a portion of the window molding apparatus shown in FIG. 8.

FIG. 9 is a perspective view of the core molding part CR in the window molding apparatus of FIG. 5, and FIG. 10 is a perspective view of a molding jig in the window molding apparatus of FIG. 5. FIG. 11 is a cross-sectional view illustrating a portion of the window molding apparatus shown in FIG. 8. Referring to FIG. 9, the core molding part CR may include a bent molding portion CR-B and a flat molding portion CR-P. The bent molding portion CR-B may be a portion corresponding to the bent portion BP (see FIG. 6) of the member P-WP to be processed (see FIG. 6). The bent molding portion CR-B may be a portion that contacts the bent portion BP of the member P-WP to be processed (see FIG. 6) during the molding of the window. The bent molding portion CR-B may have a shape corresponding to the shape of the bent portion BP (FIG. 6) to be molded. For example, the bent molding portion CR-B may have a curved surface of which a portion contacting the bent portion BP (see FIG. 6) has a predetermined radius of curvature or may have a generally staple-type shape. A bottom surface of the bent molding portion CR-B, which contacts the member P-WP to be processed (see FIG. 6) may have a radius of curvature of about 1 mm to about 10 mm. The radius of curvature of the bottom surface of the bent molding portion CR-B may correspond to the radius of curvature RI of the inner side of the window WP-IS (see FIG. 3).

The bent molding portion CR-B may be a molding jig that contacts the bent portion BP of the member P-WP to be processed (see FIG. 6), which is provided to be flat so that the bent portion BP (FIG. 6) has a bent shape. The core molding part CR may be a molding jig for forming the shape of the inside of the window WP-IS (see FIG. 3).

The flat molding portion CR-P may be a portion disposed on the bent molding portion CR-B. The flat molding portion CR-P may be a portion provided integrally with the bent molding portion CR-B. The flat molding portion CR-P may include a first flat molding surface CR-P1 (see FIG. 11) and a second flat molding surface CR-P2 (see FIG. 11), which are flat surfaces. The first flat molding surface CR-P1 (see FIG. 11) and the second flat molding surface CR-P2 (see FIG. 11) may be substantially parallel to each other.

Referring to FIGS. 5 to 9, in the window molding apparatus PE, the core molding part CR may move downward so that the bent molding portion CR-B contacts the bent portion BP of the member P-WP to be processed (see FIG. 6) to bend the bent portion BP and allow the flat portions PP-1 and PP-2 to be sequentially adjacent to the flat molding portion CR-P of the core molding part CR.

In the core molding part CR, a portion in contact with the member P-WP to be processed may include graphite, silicon carbide, silicon nitride, molybdenum disilicide ($MoSi_2$), aluminum oxide, aluminum nitride (AlN), zirconia, or tungsten carbide (WC). However, the embodiments are not limited thereto, and an outer surface of the core molding part CR may be used without limitation as long as the outer surface is made of a material that is capable of being easily detached from the member to be processed after the molding process. Also, the outer surface of the core molding part CR may be subjected to release treatment so as not to be bonded to the member P-WP to be processed.

The core molding part CR may be directly heated to emit heat or may be heated by receiving heat from a core heating part HT-a, which is an external heating unit. Also, the core molding part CR may not be directly emit heat or not be heated by receiving heat from the core heating part HT-a but may increase in temperature by heat transferred from the molding jig CV disposed below the core molding part CR.

The window molding apparatus PE shown in FIGS. 5 and 7 may further include a pressing part AP. The pressing part AP may be disposed on the core molding part CR. The pressing part AP may be controlled to operate in the vertical direction. The pressing part AP may move in the vertical direction. The pressing part AP may move downward so that the core molding part CR is inserted into the groove HP of the molding jig CV. The pressing part AP may press the core molding part CR. The pressing part AP may move the core molding part CR in the downward direction to provide a pressure of about 10 psi to about 100 psi to the core molding part CR.

The window molding apparatus PE may further include an operation controller for controlling the vertical movement of the core molding part CR. The operation controller may include an operation motor that allows the core molding part CR to move in the vertical direction or a fixing part that fixes the core molding part CR. The operation controller may be disposed on an upper portion of the core molding part CR or a side surface of the core molding part CR and then may be connected to the core molding part CR. Also, in an embodiment, the operation controller may be disposed on the pressing part AP. For example, the pressing part AP may be controlled by the operation controller, and the core molding part CR may move in the vertical direction by the pressing part AP.

As already mention above, FIG. 10 is a perspective view of the molding jig CV provided in the window molding apparatus PE of FIG. 5, and FIG. 11 is a cross-sectional view illustrating a portion of the window molding apparatus. Specifically, FIG. 11 illustrates a state in which the core molding part CR is partially inserted into the molding jig CV.

Referring to FIGS. 5, 7, 8 and 10, the molding jig CV may be fixed on the support table BS. The molding jig CV may include a support surface SS on which the member P-WP to be processed is seated and a groove HP recessed from the support surface SS. The groove HP may be a portion into which the core molding part CR is inserted when the core molding part CR operates to move downward. That is, the groove HP may have a shape corresponding to that the core molding part CR.

The member P-WP to be processed and the core molding part CR may be inserted into the groove HP. When the core molding part CR operates in the downward (down) direction, the core molding part CR may be inserted into the groove HP with the member P-WP to be processed therebetween, and the member P-WP to be processed may be molded to have the bent portion BP and flat portions PP-1 and PP-2.

The molding jig CV may include a bent portion jig CV-B, in which the groove HP is defined, and first and second supports CV-P1 and CV-P2 disposed at both sides with the bent portion jig CV-B therebetween. The first support CV-P1, the bent portion jig CV-B, and the second support CV-P2 may be integrated with each other. In the molding jig CV, the first support CV-P1 and the second support CV-P2 may provide the support surface SS on which the member P-WP to be processed is seated.

The bent portion jig CV-B may include a groove HP recessed downward, and the bottom surface HP-B of the groove HP may have a shape corresponding to that of the bent portion BP to be molded. The bottom surface HP-B of the groove HP may have a curved surface corresponding to that of the bent molding portion CR-B. The bottom surface HP-B of the groove HP may correspond to that of the outside of the bent portion BP to be molded. For example, the bent portion jig CV-B may have a curved surface of which a portion contacting the bent portion BP has a predetermined radius of curvature or may have a staple shape. In the bent portion jig CV-B in contact with the member P-WP to be processed, the bottom surface of the groove HP may have a radius of curvature of about 1 mm to about 10 mm. The radius of curvature of the bottom surface of the groove HP may correspond to a radius of curvature RO of the outer side WP-OS (see FIG. 3) of the window.

The bent portion jig CV-B may be a molding jig which contacts the bent portion BP of the member P-WP to be processed, which are provided to be flat so that the bent portion BP has a bent shape. The groove HP may be a molding jig for processing the shape of the outer side WP-OS of the window.

Referring to FIG. 11, The groove HP of the bent portion jig CV-B have a bent surface HP-C and first and second flat portion surfaces HP-F1 and HP-F2 facing each other with the bent surface HP-C therebetween. The first flat portion surface HP-F1 and the second flat portion surface HP-F2 may be surfaces extending substantially parallel to each other from the bent surface HP-C. The first flat portion surface HP-F1 and the second flat portion surface HP-F2 may be spaced a first distance D1 from each other. The distance "D1" between the first flat portion surface HP-F1 and the second flat portion surface HP-F2 is greater than the sum of a width of the core molding part CR and a thickness of the member P-WP to be processed. The width of the core molding part CR may be a distance between a first flat molding surface CR-P1 and a second flat molding surface CR-P2, which face each other.

As illustrated in FIG. 11, the first flat portion surface HP-F1 and the second flat portion surface HP-F2 may be a first distance D1 from each other in a state in which the core molding part CR is inserted into the groove HP. That is, the first flat portion surface HP-F1 and the second flat portion surface HP-F2, which define the groove HP in the molding jig CV may be spaced the first distance D1 from each other with the core molding part CR therebetween in the state in which the core molding part CR is inserted.

In an embodiment, the first flat portion surface HP-F1 and the second flat portion surface HP-F2 may be spaced a predetermined distance from each other in the state in which the core molding part CR is inserted. That is, in an embodiment, the first flat portion surface HP-F1 and the second flat portion surface HP-F2 may be spaced apart from the first flat molding surface CR-P1 and the second flat molding surface CR-P2, respectively. When the core molding part CR is inserted into the groove HP, the first flat portion surface HP-F1 may be spaced a predetermined distance from the first flat molding surface CR-P1, and the second flat portion surface HP-F2 may be spaced a predetermined distance from the second flat molding surface CR-P2. The spaced distance between the first flat portion surface HP-F1 and the first flat molding surface CR-P1 or the spaced distance between the second flat portion surface HP-F2 and the second flat molding surface CR-P2 may be greater than the thickness of the member P-WP to be processed.

Also, the bent surface HP-C of the groove HP may be spaced a predetermined distance from the core molding part CR in the state in which the core molding part CR is inserted. The bent surface HP-C of the groove HP may be spaced to face the bent molding portion CR-B in the state in which the core molding part CR is inserted.

The bent portion jig CV-B may include a rail. The rail may be a portion serving as a guide when the core molding part CR moves in the vertical direction.

In the window molding apparatus PE as shown in FIGS. 5 and 7, a portion of the molding jig CV, which contacts the member P-WP to be processed may include graphite, silicon carbide, silicon nitride, molybdenum disilicide ($MoSi_2$), aluminum oxide, aluminum nitride (AlN), zirconia, or tungsten carbide (WC). However, the embodiments are not limited thereto, and an outer surface of the molding jig CV may be used without limitation as long as the outer surface is made of a material that is capable of being easily detached from the member to be processed after the molding process. Also, the outer surface of the molding jig CV may be subjected to release treatment so as not to be bonded to the member P-WP to be processed.

The window molding apparatus PE shown in FIGS. 5 and 7 may further include a jig heating part HT-b that provides heat to the molding jig CV. The jig heating part HT-b may be disposed adjacent to the bent portion jig CV-B. The jig heating part HT-b may be disposed adjacent to the groove HP. The jig heating part HT-b may surround the bent portion jig CV-B. The jig heating part HT-b may surround the groove HP so as to provide heat to the groove HP.

The jig heating part HT-b may be surround the bent portion jig CV-B and thus provide heat to the molding jig CV to mold the member P-WP to be processed. When the bent portion jig CV-B increases in temperature by the heat provided by the jig heating part HT-b, the temperature around the groove HP in the molding jig CV may be controlled to the highest temperature. In the molding jig CV, the groove HP may have the highest temperature, and then, the temperature may gradually decrease toward the first support CV-P1 and the second support CV-P2. In the molding jig CV, the temperature around the groove HP may be about 600° C. or more. For example, the temperature around the groove HP in the molding jig CV may range of about 650° C. to about 750° C.

Figure 12:
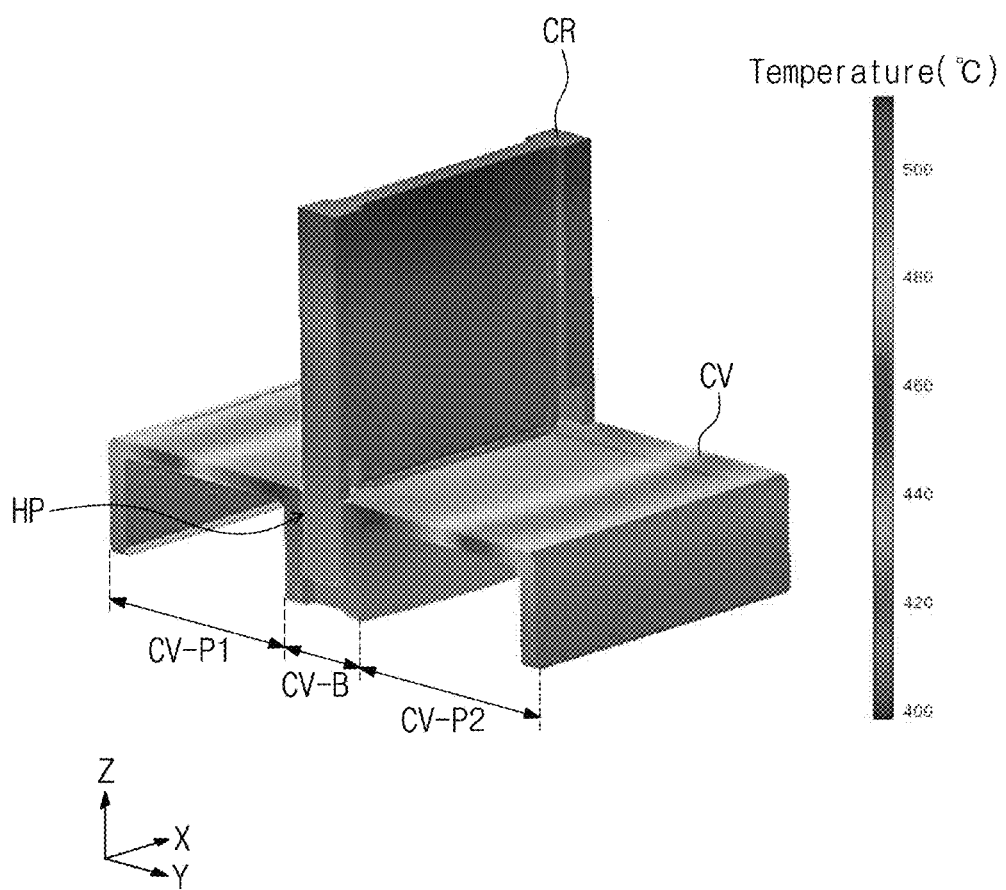
FIG. 12 is a view illustrating a temperature profile of the core molding part and the molding jig in the window molding apparatus of FIG. 5.

FIG. 12 is a view illustrating a temperature profile of the core molding part and the molding jig in the window molding apparatus of FIG. 5. Referring to the temperature scale bar, the bent portion jig CV-B of the molding jig CV has the highest temperature, and then the temperature gradually decreases in a direction away from the bent portion jig CV-B. The temperature of the core molding part CR disposed corresponding to the bent portion jig CV-B gradually decreases in the direction of the Z-axis Z. That is a portion of the core molding part CR, which is inserted into the groove HP, has the highest temperature, and the temperature of the core molding part CR gradually decreases as being away from the groove HP. The core molding part CR inserted in the groove HP may have a temperature of about 400° C. or more. The first support CV-P1 and the second support CV-P2 may refer to portions that are spaced apart from each other with the bent portion jig CV-B therebetween and are not limited to the shape illustrated in this specification. The first support CV-P1 and the second support CV-P2 may include not only the top surface of the molding jig CV providing the support surface SS (see FIG. 10), but also a supporting portion, which is disposed below the support surface SS of the molding jig CV. In FIGS. 10 and 12, even though the first support CV-P1, the bent portion jig CV-B, and the second support CV-P2 are illustrated in different forms, the molding jig CV may include portions that are divided into the bent portion jig CV-B, the first support CV-P1 and the second support CV-P2.

Figure 13A:
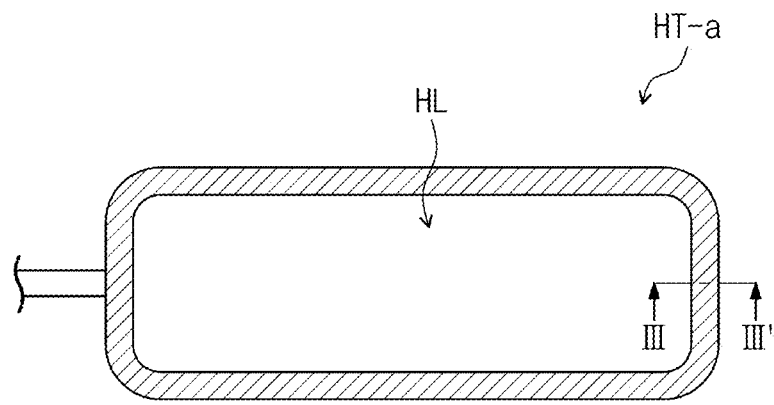
FIG. 13A is a plan view of a core heating part in the window molding apparatus of FIG. 5.
Figure 13B:
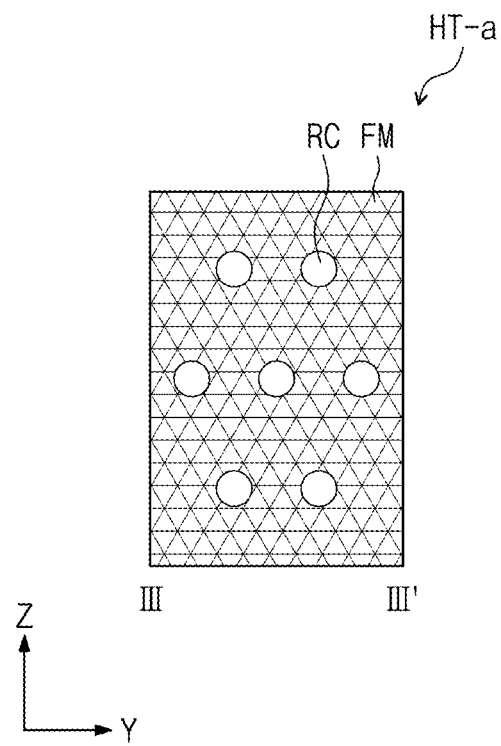
FIG. 13B is a cross-sectional view of the core heating part taken along line of FIG. 13A.

The window molding apparatus PE shown in FIGS. 5 and 7 may further include the core heating part HT-a. FIG. 13A is a plan view of a core heating part in the window molding apparatus of FIG. 5, and FIG. 13B is a cross-sectional view of the core heating part taken along line of FIG. 13A. FIG. 13A is a plan view of the core heating part HT-a on a surface substantially parallel to the plane defined by the X-axis X and the Y-axis Y. FIG. 13B is a cross-sectional view taken along line of FIG. 13A. The core heating part HT-a may be disposed adjacent to the core molding part CR. For example, the core heating part HT-a may be disposed on the core molding part CR before the core molding part CR moves downward.

Referring to FIGS. 5, 7, 13A, and 13B, the core heating part HT-a may include a through-hole HL. The through-hole HL may overlap the core molding part CR. The core heating part HT-a may have a generally ring shape in which the through-hole HL has a width in the direction of the Y-axis Y greater than a width in the direction of the X-axis. The core heating part HT-a may be controlled to move in the vertical direction. The core heating part HT-a may be controlled to move in the vertical direction so that the core molding part CR is disposed in the through-hole HL of the core heating part HT-a. The core heating part HT-a may include an induction heating coil RC. A plurality of induction heating coils RC may be disposed inside the core heating part HT-a. A filler FM may be disposed between the induction heating coils RC. The filler FM may include a heat-resistant material. The filler FM may include a shielding agent. Unlike FIG. 13B, the filler FM may be omitted, and the induction heating coils RC may be spaced apart from each other in a mold of the core heating part HT-a. FIGS. 13A and 13B exemplarily illustrate the shape of the core heating part HT-a, but the jig heating part HT-b may also have a shape similar to that of the core heating part HT-a that is described with reference to FIGS. 13A and 13B. The jig heating part HT-b may also include an induction heating coil.

Figure 14:
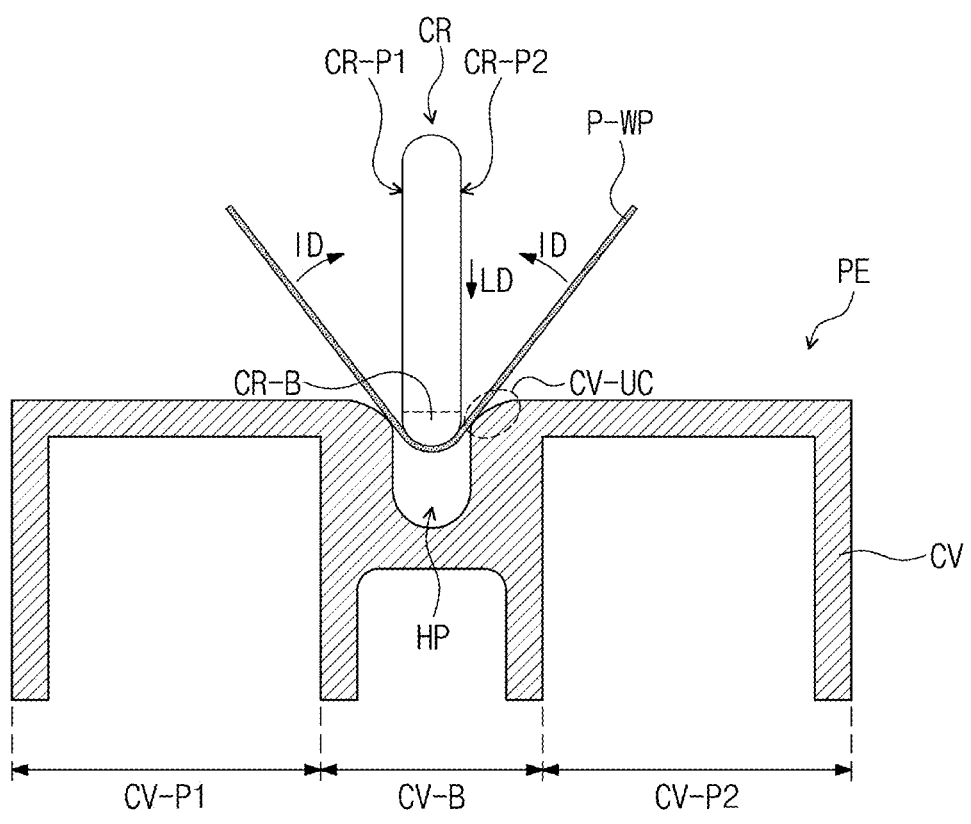
FIG. 14 is a cross-sectional view illustrating a portion of a window molding process using the window molding apparatus of FIG. 5.

FIG. 14 illustrates a portion of processes of processing the member P-WP to be processed using the window molding apparatus PE of FIG. 5. FIG. 14 illustrates an intermediate state between a first state illustrated in FIG. 5 and a second state illustrated in FIG. 7. Specifically, FIG. 14 illustrates an intermediate state between the first state illustrated in FIG. 5 and the second state illustrated in FIG. 7. The first state illustrated in FIG. 5 may be a state in which the first flat portion PP-1 (see FIG. 6), the bent portion BP, and the second flat portion PP-2 (see FIG. 6) of the member P-WP to be processed are flat before the member P-WP to be processed is processed, i.e., a state in which the core molding part CR is spaced apart from the molding jig CV with the member P-WP to be processed therebetween. The second state illustrated in FIG. 7 may be a state in which the bent portion BP (see FIG. 6) of the member P-WP to be processed is in contact with the bent molding portion CR-B of the core molding part CR, and the first flat portion PP-1 (see FIG. 6) and the second flat portion PP-2 (see FIG. 6) are adjacent to the flat molding portion CR-P (see FIG. 9) of the core molding part CR. That is, the second state may be a state in which at least a portion of the core molding part CR is inserted into the groove HP in the state in which at least a portion of the member P-WP to be processed is concavely bent in the direction of the groove HP.

Referring to FIG. 14, the core molding part CR may be disposed in the groove HP of the bent portion jig CV-B, and the core molding part CR may move in a downward direction LD so that a portion of the member P-WP to be processed is inserted into the groove HP. As the core molding part CR is inserted into the groove HP, the flat portions of the member P-WP to be processed are bent in a direction ID adjacent to the core molding part CR. In FIG. 14, a top surface CV-UC of the top surface of the molding jig CV, in which the groove HP is defined, is illustrated as a curved surface. That is, a top surface of the bent portion jig CV-B may include a bent surface CV-UC. The top surface of the bent portion jig CV-B, which contacts the member P-WP to be processed when the member P-WP to be processed is bent, may include the bent surface CV-UC. The top surface CV-UC of the molding jig, which is adjacent to the groove HP, may be provided as the curved surface to minimize damage of the member P-WP to be processed, which contacts the top surface CV-UC, when the member P-WP to be processed is inserted into the groove HP. However, the embodiments are not limited thereto. For example, the shape of the top surface CV-UC of the molding jig, which is adjacent to the groove HP, may be different from that illustrated in the drawings.

The window molding apparatus PE shown in FIGS. 5 and 7 may include the core molding part CR and the molding jig CV in which the groove HP is concavely depressed so that the core molding CR part is inserted. As a result, the window molding apparatus PE may be used for manufacturing the window WP shown in FIG. 3 including the bent portion BP and the two flat portions PP-1 and PP-2 facing each other with the bent portion therebetween. That is, the window molding apparatus PE may include the molding jig CV having the concavely recessed groove HP, the core molding part CR inserted in the groove HP, and the jig heating part HT-b for heating the molding jig CV to thermally mold the member P-WP to be processed, thereby manufacture the window WP that is bent at an angle of about 180°.

Hereinafter, a method of molding a window will be described with reference to FIGS. 15 to 17D. A window molding method, which will be described later, according to an embodiment may correspond to a window molding method using the window molding apparatus according to the foregoing embodiment. Hereinafter, in the description of the wind molding method, repetitive description of the window molding apparatus according to the foregoing embodiments will not be described again to avoid redundancy, and differences therebetween will be mainly described.

Figure 15:
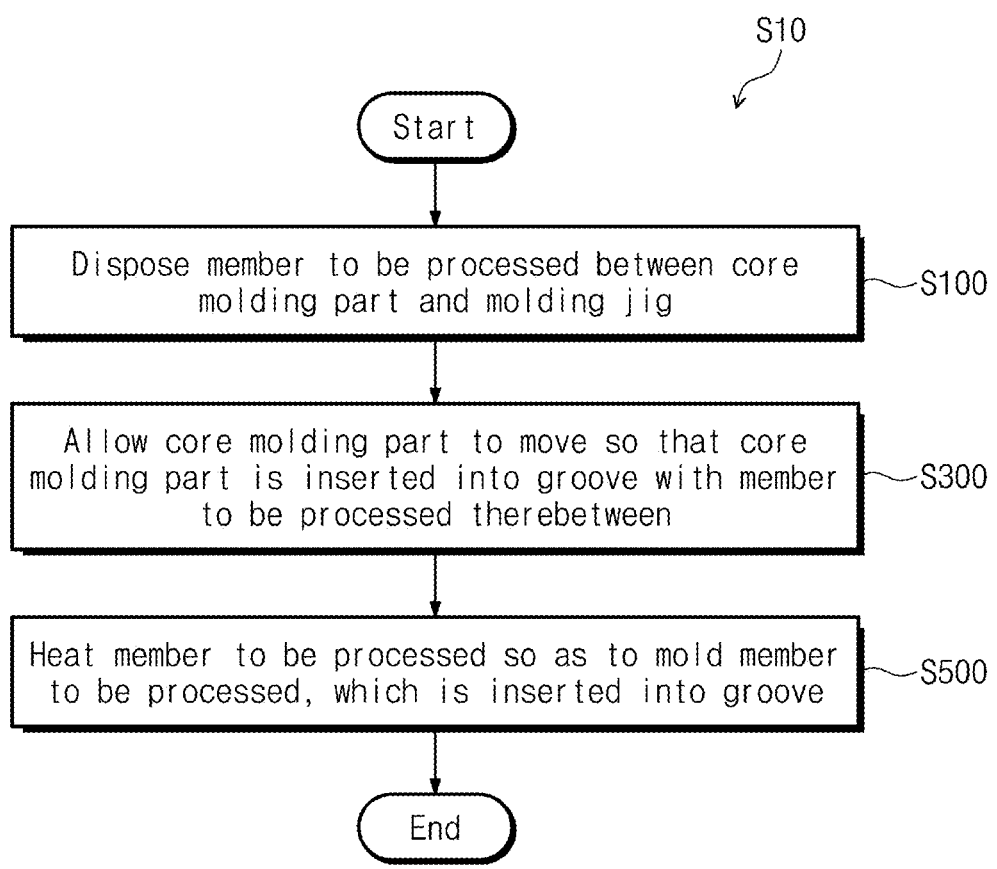
FIG. 15 is a flowchart of an embodiment of a window molding method according to the principles of the invention.
Figure 16:
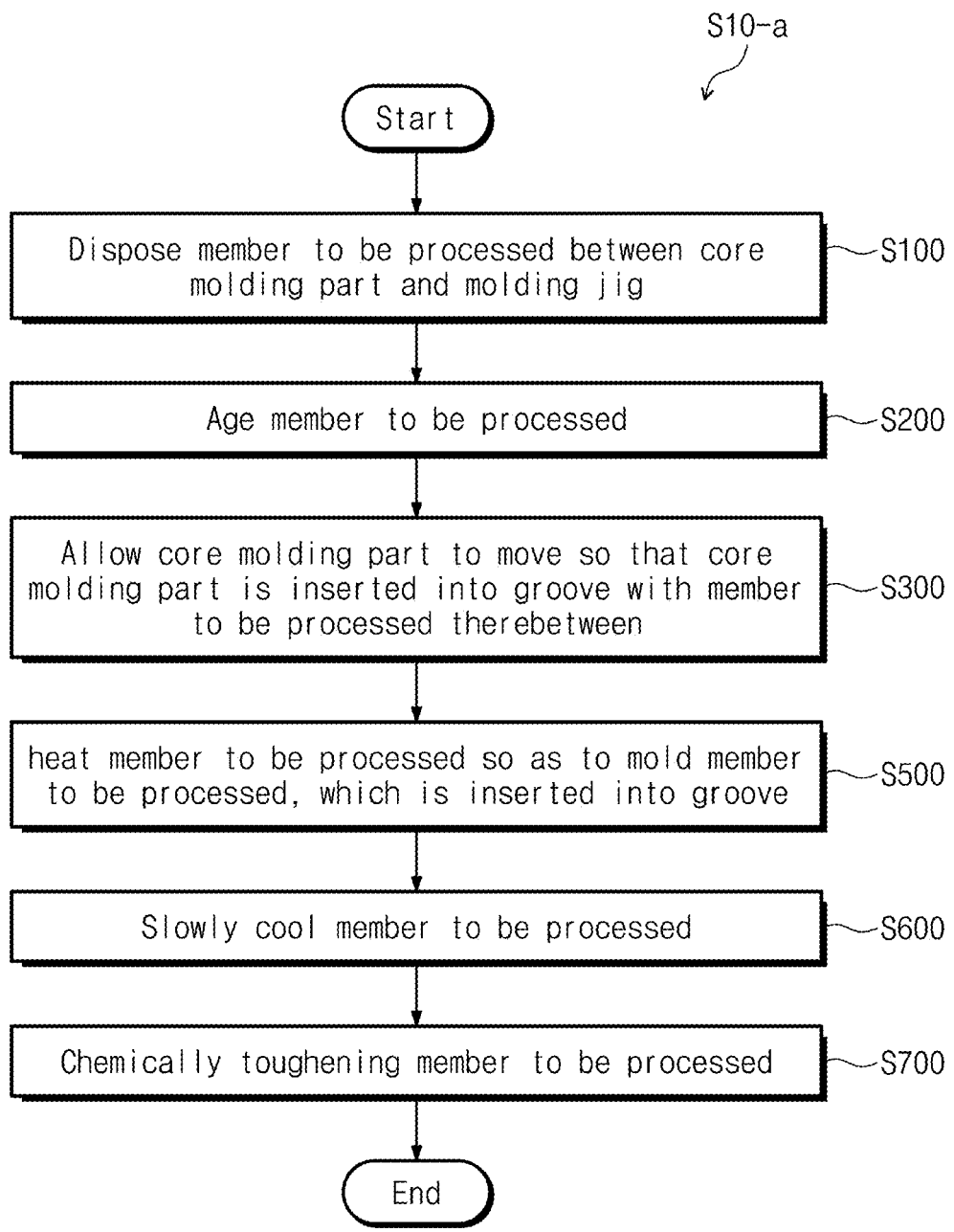
FIG. 16 is a flowchart of another embodiment of a window molding method according to the principles of the invention.

FIG. 15 is a flowchart of an embodiment of a window molding method according to the principles of the invention, and FIG. 16 is a flowchart of another embodiment of a window molding method according to the principles of the invention. FIGS. 17A through 17D are cross-sectional views illustrating a portion of the window molding methods shown in FIG. 15 and/or FIG. 16.

Referring to FIGS. 5, 7 and 15, the window molding method of an embodiment may be performed using the window molding apparatus PE shown in FIGS. 5 and 7, which includes a core molding part CR and a molding jig CV.

A window molding method (S10) includes a first step (S100) of disposing a member P-WP to be processed between the core molding part CR and the molding jig CV and a third step (S300) of allowing the core molding part CR to move so that the core molding part CR is inserted into a groove HP with the member P-WP to be processed therebetween. Alternatively, a window molding method (S10) includes the first step (S100) of disposing a member P-WP to be processed between the core molding part CR and the molding jig CV, the third step (S300) of allowing the core molding part CR to move so that the core molding part CR is inserted into a groove HP with the member H-WP to be processed therebetween, and a fifth step (S500) of heating the molding jig CV to mold the member P-WP to be processed, which is inserted into the groove HP.

Alternatively, referring to FIGS. 5, 7 and 16, a window molding method (S10-a) may further include a second step (S200) of aging the member P-WP to be processed after the first step (S100) of disposing the member P-WP to be processed between the core molding part CR and the molding jig CV, as discussed below. Further, the window molding method (S10-a) may further include a sixth step (S600) of slowing cooling the member P-WP to be processed and a seventh step (S700) of chemically toughening the member P-WP to be processed after the fifth step (S500) of heating the molding jig CV to mold the member P-WP to be processed, which is inserted into the groove HP.

The member P-WP to be processed, which is molded through each of the window molding methods (S10 and S10-a) may be a glass substrate. The member P-WP to be processed, which is molded through each of the window molding methods (S10 and S10-a) may have a thickness of about 0.1 mm to about 1.0 mm.

Figure 17A:
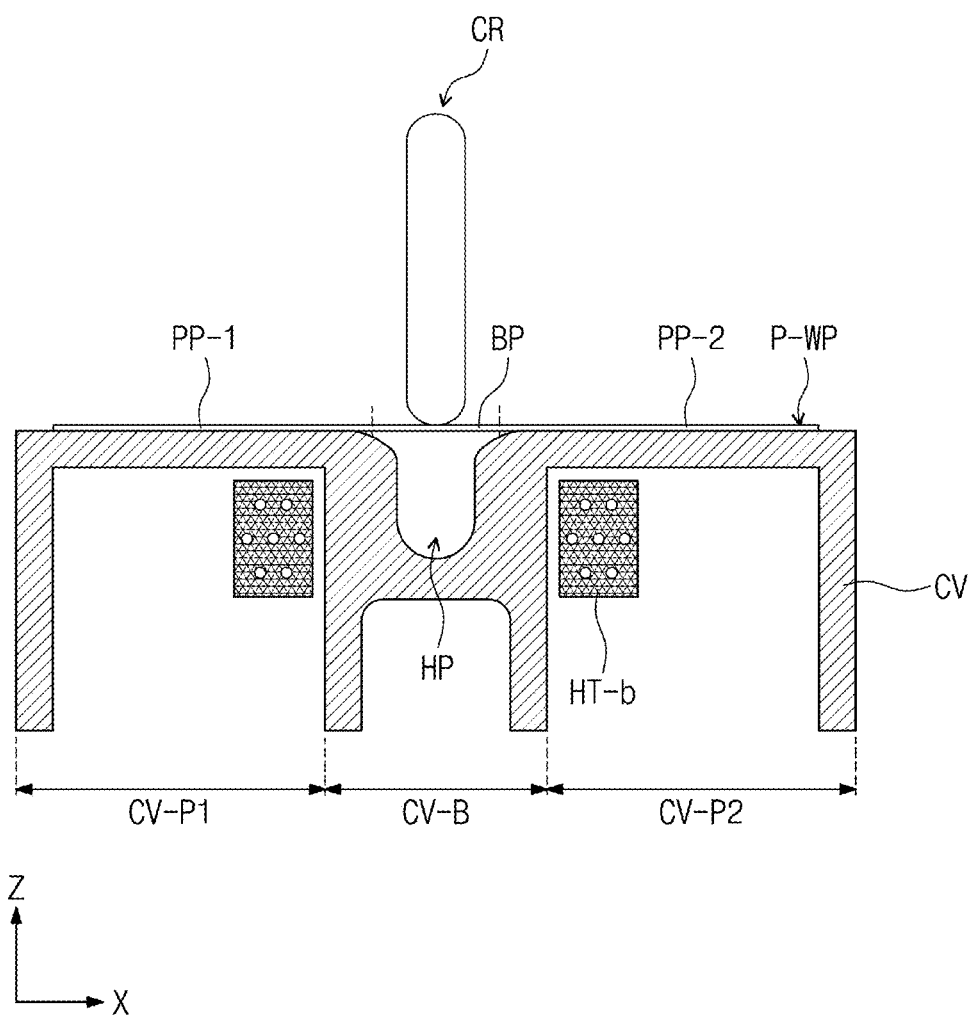
FIGS. 17A through 17D are cross-sectional views illustrating a portion of the window molding methods shown in FIG. 15 and/or FIG. 16.

FIG. 17A is a schematic view illustrating the first step (S100) of disposing the member P-WP to be processed between the core molding part CR and the molding jig CV. The member P-WP to be processed may be disposed on the molding jig CV. The member P-WP to be processed may be disposed between the molding jig CV and the core molding part CR in a flat state. The molding jig CV may be heated by heat provided by a jig heating part HT-b.

The member P-WP to be processed may be heated e.g., aged) by the heat provided by the molding jig CV. For example, the member P-WP to be processed may be aged by being heated for a given time. The second step (S200) of heating (i.e., aging) the member P-WP to be processed may be performed before the third step (S300) of allowing the core molding part CR to move so that the core molding part CR is inserted into the groove HP with the member P-WP to be processed therebetween. The member P-WP to be processed may be heated in a state of being seated on the molding jig CV, and the heating may be performed before a pressure is applied to the member P-WP to be processed. An heating temperature of the member P-WP to be processed may be a temperature in a section in which the glass substrate, which is the member P-WP to be processed, exhibits viscoelasticity. The heating temperature may be a temperature in a section in which viscosity of the glass substrate, which is the member P-WP to be processed, ranges of about $10^7$ poise to about $10^9$ poise. For example, the heating temperature may be about 550° C. or more. However, the embodiment is not limited thereto.

Figure 17B:
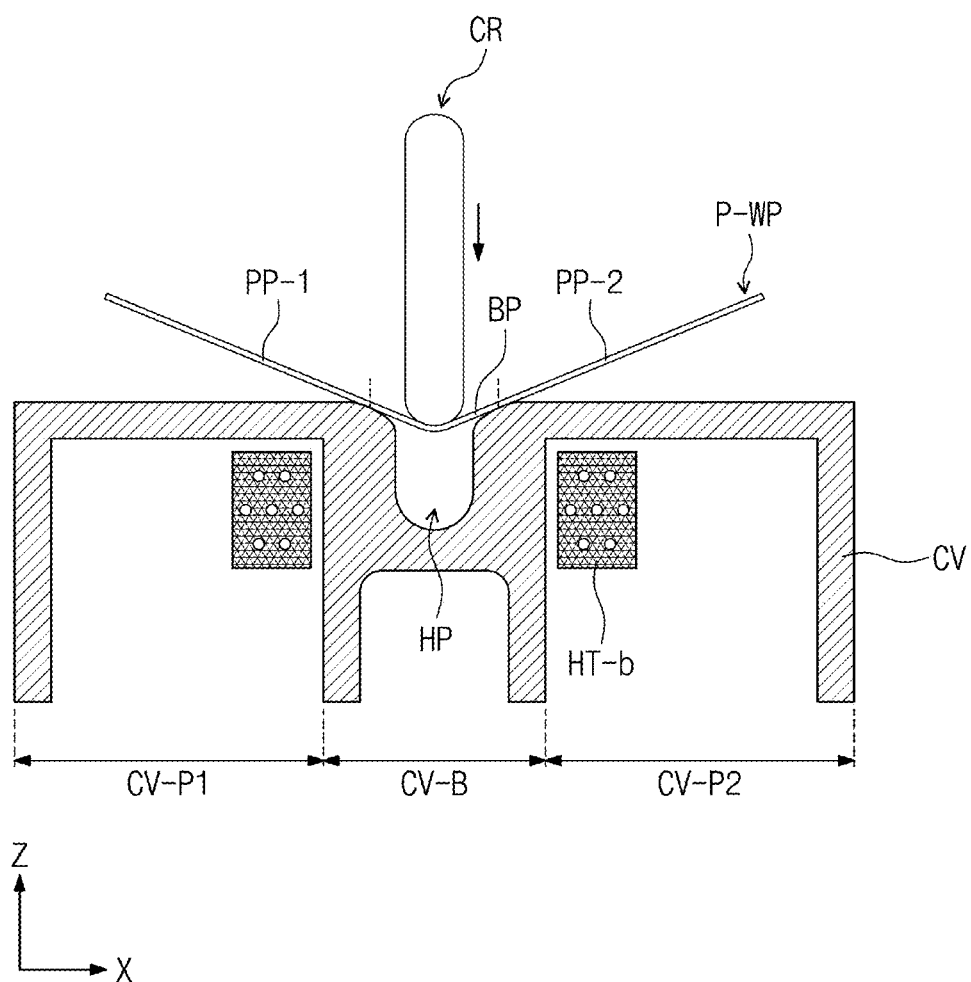

FIG. 17B is a schematic view illustrating the third step (S300) of allowing the core molding part CR to move so that the core molding part CR is inserted into the groove HP with the member P-WP to be processed therebetween. The core molding part CR may move downward so that the core molding part CR is inserted into the groove HP of the molding jig CV with the member P-WP to be processed therebetween. For example, the third step (S300) of allowing the core molding part CR to move may include a step of pressing the member P-WP to be processed at a pressure of about 10 psi to about 100 psi. In the third step (S300) of allowing the core molding part CR to move, the flat portions PP-1 and PP-2 of the member P-WP to be processed may be bent to adjacent to the flat molding portion CR-P of the core molding part while the core molding part CR of the member P-WP to be processed moves into the groove HP of the molding jig CV. In the third step (S300) of allowing the core molding part CR to move, at least a portion of the member P-WP to be processed may be inserted into the groove HP, and the first flat portion (a first portion) PP-1 and the second flat portion (a second portion) PP-2 may be molded to face each other with the core molding part CR therebetween.

Each of the window molding methods (S10 and S10-a) shown in FIGS. 15 and 16 may include the fifth step (S500) of heating the molding jig CV to mold the member P-WP to be processed, which is inserted into the groove HP, after the third step (S300) of allowing the core molding part to move. The process (S500) of molding the member P-WP to be processed may include a step of molding the first flat portion PP-1 and the second flat portion PP-2 of the member P-WP to be processed, which is inserted into the groove HP, so that the first flat portion PP-1 and the second flat portion PP-2 face each other with the core molding part CR therebetween.

The fifth step (S500) of molding the member P-WP to be processed may include a step of providing heat to the member P-WP to be processed so that the member P-WP to be processed has viscosity of about $10^7$ poise to about $10^9$ poise. In the fifth step (S500) of molding the member P-WP to be processed, the molding jig CV may be directly controlled to be heated. For example, the entire molding jig CV may be heated to control a temperature of the molding jig CV.

Also, the fifth step (S500) of molding the member P-WP to be processed may include a step of providing heat to the bent portion jig CV-B (see FIG. 9) so that the member P-WP to be processed has viscosity of about $10^7$ poise to about $10^9$ poise. That is, in the fifth step (S500) of molding the member P-WP to be processed, the heat may be provided only to the bent portion jig CV-B (see FIG. 9) of the molding jig CV.

The bent portion jig CV-B (see FIG. 9) may receive the heat from the jig heating part HT-b disposed to surround the bent portion jig CV-B (see FIG. 9).

In the fifth step (S500) of molding the member P-WP to be processed, a temperature outside the member P-WP to be processed, which is adjacent to the groove HP, may be controlled to be greater than a temperature inside the member P-WP to be processed, which is adjacent to the core molding part CR. In the fifth step (S500) of molding P-WP the member to be processed, the temperature of the molding jig CV may be maintained to be greater than the temperature of the core molding part CR.

The molding jig CV may be controlled in temperature by using the jig heating part HT-b, and the core molding part CR may be controlled in temperature by using the core heating part HT-a. The core heating part HT-a (see FIG. 5) may heat the member P-WP to be processed in a state in which the member P-WP to be processed is seated on the molding jig CV as illustrated in FIG. 17A. The core heating part HT-a (see FIG. 5) may be controlled to move in the vertical direction so that the core molding part CR is inserted into a through-hole HL (see FIG. 13a) of the core heating part HT-a (see FIG. 5). The temperature of the flat molding portion CR-P (see FIG. 9) of the core molding part CR may be controlled by the core heating part HT-a (see FIG. 5).

For example, an outer side of the member P-WP to be processed, which is adjacent to the groove HP, may be heated to a temperature of about 650° C. to about 750° C. The inside of the member P-WP to be processed may be controlled to a temperature less than that of the outside. For example, the inside of the member P-WP to be processed may be controlled to a temperature of about 400° C. or less. In the window molding method according to an embodiment, the temperature of an inner side of the member P-WP to be processed and bent may be maintained to a temperature less than that of the outside thereof to stably maintain dimensions of the member P-WP to be processed, which is molded to have the bent portion, thereby achieving a state in which stress occurring during the molding is relieved.

Figure 17C:
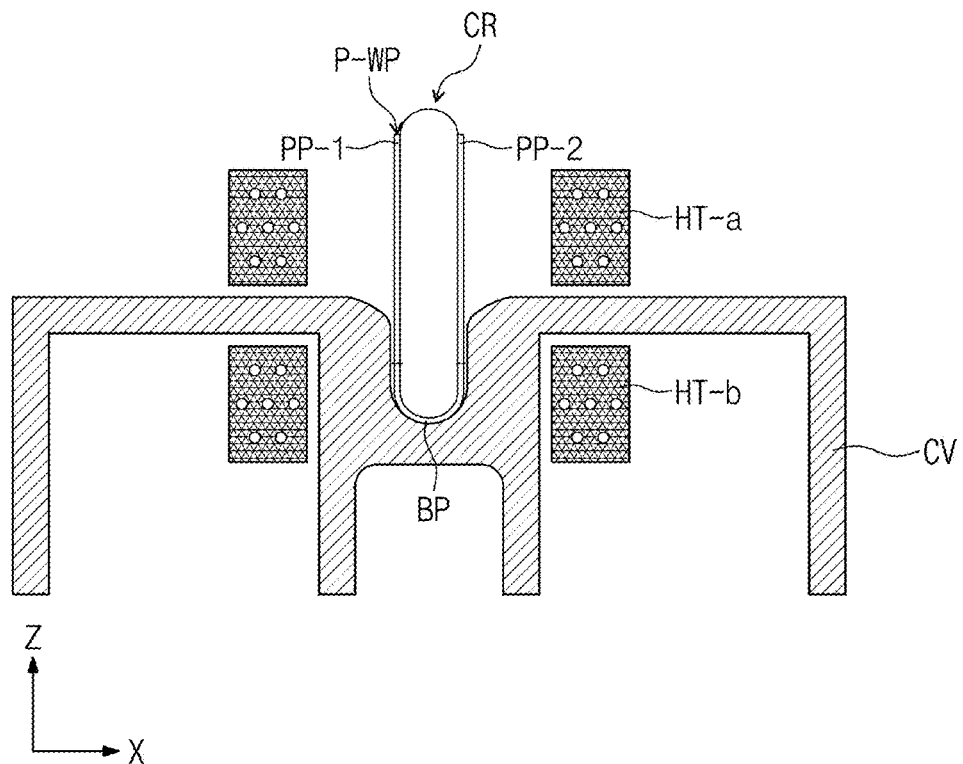

FIG. 17C is a schematic view illustrating the step of molding the first flat portion PP-1 and the second flat portion PP-2 of the member P-WP to be processed, which is inserted into the groove HP, so that the first flat portion PP-1 and the second flat portion PP-2 face each other with the core molding part CR therebetween. Referring to FIG. 17C, the core molding part CR may be inserted into the groove HP, and at least a portion of the member P-WP to be processed may be inserted into the groove HP.

Referring to FIG. 17C, in the window molding method according to an embodiment, the core heating part HT-a may be disposed outside the member P-WP to be processed in the state in which the flat portions PP-1 and PP-2 of the member to be processed are bent to be adjacent to the core molding part CR to control the temperature of the member P-WP to be processed. However, the embodiments are not limited thereto. For example, the core heating part HT-a may be fixed to an upper portion of the core molding part CR in the state in which the flat portions PP-1 and PP-2 of the member to be processed are bent to be adjacent to the core molding part CR. In this case, the core heating part HT-a may not operate, and the core heating part HT-a may be maintained at room temperature without being heated.

The window molding method S10-a shown in FIG. 16 may further include the sixth step (S600) of slowly cooling the member P-WP to be processed. The sixth step (S600) of slowly cooling the member P-WP to be processed may be performed after the step of molding the member to be processed. The sixth step (S600) of slowly cooling the member P-WP to be processed may be performed in a state of being fixed to the window molding apparatus PE or may be performed by separating the member P-WP to be processed from the window molding apparatus PE.

Figure 17D:
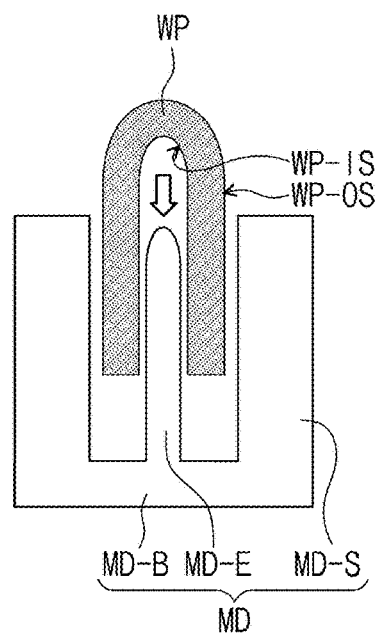

Also, the sixth step (S600) of slowly cooling the member P-WP to be processed may be performed using a separate module MD (see FIG. 17D). The sixth step (S600) of slowly cooling the member P-WP to be processed may be performed to stabilize numerical values of the processed member and relieve the stress occurring in the processing process. The sixth step (S600) of slowly cooling the member to be processed may be performed at a temperature less than a thermal molding temperature at which the fifth step (S500) of molding the member to be processed is performed. Alternatively, the sixth step (S600) of slowly cooling the member to be processed may be performed at room temperature.

FIG. 17D is a schematic view illustrating the sixth step (S600) of slowly cooling the member to be processed. FIG. 17D illustrates a process of inserting a processed window WP, which is bent by performing the processes illustrated in FIGS. 17A to 17C, into a module MD to slowly cool the member to be processed. The module MD may include a base MD-B, a protrusion MD-E, and an outer support MD-S. The protrusion MD-E may be disposed on the base MD-B to serve as a support supporting the window WP. The outer support MD-S may be disposed on the base MD-B and may be disposed at both ends of the base MD-B with respect to the protrusion MD-E. The protrusion MD-E may have a shape corresponding to an inner shape of the window WP inserted into the protrusion MD-E. A flat portion of the window WP may be inserted into a space between the outer support MD-S and the protrusion MD-E.

In FIG. 17D, although the outer support MD-S and the base MD-B are integrated with each other, the embodiments are not limited thereto. Unlike this, the outer support MD-S may be configured to be separated from the base MD-B, and when the window WP is inserted into the protrusion MD-E, an outer side WP-OS of the window WP may be surrounded.

The window molding method (S10-a) shown in FIG. 16 may further include the seventh step (S700) of chemically toughening the member to be processed. The seventh step (S700) of chemically toughening the member to be processed may be a process of chemically toughening the window WP in toughening molten salt. For example, the seventh step (S700) of chemically toughening the member to be processed may be performed in a temperature range of about 400° C. to about 500° C., but the embodiments are not limited thereto.

The window molding method (S10-a) shown in FIG. 16 may further include a step of polishing the member to be processed. The step of polishing the member to be processed may be performed after the fifth step (S500) of molding the member to be processed. In the step of polishing the member to be processed, only the outer surface of the member to be processed may be polished. The outer side WP-OS of the window in which the polishing process is performed may have surface roughness of about 3 Å to about 7 Å. In addition, the inner side WP-IS of the window in which the polishing is not performed may have surface roughness of about 3 Å or less. As used herein, the surface roughness represents arithmetic average roughness.

Window molding method according to the principles and an embodiment of the invention may be used to manufacture the window including the bent portion that is bent at a large bending angle by using the window molding apparatus including the core molding part and the molding jig having the groove into which the core molding part is inserted. Particularly, window molding methods according to an embodiment may be used to manufacture the window that is bent at an angle of about 180°, in which the flat portions disposed on both the sides of the bent portion face each other in a substantially parallel configuration.

Window molding apparatus constructed according to the principles and an embodiment of the invention may include the molding jig having the groove, into which a portion of the member to be processed is inserted, to manufacture the window having the bent portion that is bent at the large bending angle.

The window having the bent portion, which is bent at the large bending angle, and the flat portions disposed with the bent portion therebetween may be manufactured by using the window molding methods according to the principles and embodiments of the invention.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A window molding apparatus for processing a member having first and second opposed, substantially flat sides and a bendable portion disposed therebetween, the apparatus comprising:
    a first molding part configured to move in a substantially linear direction;
    a jig including a support surface configured to have the member is seated thereon and a recess in the support surface configured to receive the bendable portion of the member and the first molding part;
    a first heater configured to provide heat to the jig, the first heater surrounding the recess; and
    a second heater having a through-hole shaped to receive the first molding part therein,
    wherein the first molding part comprises a bent molding portion corresponding to the bendable portion, and a bottom surface of the bent molding portion is a continuously curved molding surface when viewed from a direction perpendicular to the substantially linear direction, and
    wherein the recess comprises a bent surface configured to correspond to the bent molding portion, and the bent surface is a continuously curved surface having a radius of curvature corresponding to the bent molding portion.

2. The window molding apparatus of claim 1, wherein the first molding part is configured to be:
    spaced apart from the jig with the member therebetween when the member is in a first state in which the first and second opposed flat sides and the bendable portion are flat; and
    inserted at least partially into the recess, in a second state in which the bendable portion is concavely bent in a longitudinal direction of the recess.

3. The window molding apparatus of claim 2, wherein the first molding part comprises a core molding part having a bent molding portion and a flat molding portion, and
    in the first state, the bent portion is configured to be adjacent to the bent molding portion, and each of the first flat portion and the second flat portion is configured to be spaced apart from the flat molding portion, and in the second state, the bent portion is configured to contact the bent molding portion, and the first flat portion and the second flat portion are configured to be adjacent to the flat molding portion.

4. The window molding apparatus of claim 1, wherein the second heater is configured to move in the linear direction so that the first molding part is disposed in the through-hole.

5. The window molding apparatus of claim 1, wherein the first heater comprises a jig heating part and the second heater comprises a core heating part, and at least one of which comprises an induction heating coil.

6. The window molding apparatus of claim 1, further comprising a pressing part disposed on the first molding part and configured to move in the substantially linear direction.

7. The window molding apparatus of claim 6, further comprising:
a controller configured to control the pressing part disposed on the first molding part to move in the substantially linear direction.

8. The window molding apparatus of claim 1, wherein the jig comprises a molding jig including:
a bent portion jig in which the recess is defined;
a first support disposed at one side of the bent portion jig; and
a second support disposed at the other side of the bent portion jig.

9. The window molding apparatus of claim 1,
wherein the window molding apparatus is configured to process the member that is a glass member,
wherein the bottom surface of the bent molding portion has a first radius of curvature configured to bend the bendable portion to have an inner radius of curvature corresponding to the first radius of curvature, and the bent surface of the recess has a second radius of curvature configured to bend the bendable portion to have an outer radius of curvature corresponding to the second radius of curvature,
wherein each of the first radius of curvature and the second radius of curvature is within a range of 1 mm to 10 mm, and wherein the second radius of curvature is larger than the first radius of curvature.

10. The window molding apparatus of claim 1, further comprising:
a controller configured to control the first molding part to move in the substantially linear direction and configured to control the second heater to move in the substantially linear direction so that the first molding part is positioned in the through-hole.

11. A method of molding a window from a window member having first and second portions comprising first and second opposed, substantially flat sides and a third portion that comprises a bendable portion disposed therebetween using a window molding apparatus,
the window molding apparatus comprising:
a first molding part configured to move in a substantially linear direction and comprising a bent molding portion corresponding to the bendable portion, and a bottom surface of the bent molding portion is a continuously curved molding surface when viewed from a direction perpendicular to the substantially linear direction;
a jig including a support surface configured to have the window member seated thereon and a recess in the support surface configured to receive the bendable portion of window member and the first molding part; and
a first heater to provide heat to the jig, the first heater being disposed to surround the recess; and
a second heater having a through-hole shaped to receive the first molding part therein,
the method comprising:
disposing the window member to be processed between the first molding part and the jig; and
allowing the first molding part to move so that the first molding part is inserted into the recess with the window member to be processed therebetween, and
wherein the step of allowing the first molding part to move comprises molding the first portion and the second portion so that the first portion and the second portion, which are inserted into the recess, face each other with the first molding portion therebetween.

12. The window molding method of claim 11, wherein the window member to be processed comprises a glass substrate, and
the step of molding the window member comprises heating to the window member to a temperature so that it has viscosity of about 107 poise to about 109 poise.

13. The window molding method of claim 11,
the first portion comprises a first, substantially flat portion disposed at one side of the bent portion, and
the second portion comprises a second, substantially flat portion disposed at the other side of the bent portion.

14. The window molding method of claim 11, wherein the step of allowing the first molding part to move comprises pressing the window member at a pressure of about a 10 psi to about 100 psi.

15. The window molding method of claim 11, further comprising the step of heating the jig to mold the window member when it is inserted into the recess.

16. The window molding method of claim 15, wherein, in the step of molding the window member, an outer side of the window member adjacent to the recess has a temperature greater than that of an inner side of the window member adjacent to the first molding part.

17. The window molding method of claim 15, wherein, in the step of molding the window member, the temperature of the jig is maintained greater than that of the first molding part.

18. The window molding method of claim 15, wherein the jig comprises a molding jig having a bent portion jig in which the recess is defined, a first support disposed at one side of the bent portion jig, and a second support disposed at the other side of the bent portion jig, and
the step of molding the member to be processed comprises heating the bent portion jig so that the window member has viscosity of about 107 poise to about 109 poise.

19. The window molding method of claim 15, further comprising, after the step of molding the window member, cooling the window member.

20. The window molding method of claim 19, wherein the step of cooling the member to be processed comprises inserting the window member into a mold having a shape corresponding to that of the window member.

21. The window molding method of claim 19, wherein, after the step of cooling the window member, the first portion and the second portion are maintained in substantially parallel configuration.

22. The window molding method of claim 19, further comprising, after the step of cooling the window member, chemically toughening the window member.

* * * * *